United States Patent
Leida et al.

(10) Patent No.: US 9,639,575 B2
(45) Date of Patent: May 2, 2017

(54) METHOD AND SYSTEM FOR PROCESSING DATA QUERIES

(75) Inventors: Marcello Leida, Abu Dhabi (AE); Ali Afzal, London (GB); Paul Taylor, Halesowen (GB); Basim Majeed, Abu Dhabi (AE)

(73) Assignees: Khalifa University of Science, Technology and Research, Abu Dhabi (AE); British Telecommunications plc, London (GB); Emirates Telecommunications Corporation, Abu Dhabi (AE)

( * ) Notice: Subject to any disclaimer, the term of this patent is extended or adjusted under 35 U.S.C. 154(b) by 908 days.

(21) Appl. No.: 13/435,747

(22) Filed: Mar. 30, 2012

(65) Prior Publication Data

US 2013/0262443 A1    Oct. 3, 2013

(51) Int. Cl.
*G06F 17/00*    (2006.01)
*G06F 17/30*    (2006.01)

(52) U.S. Cl.
CPC .. *G06F 17/30427* (2013.01); *G06F 17/30448* (2013.01)

(58) Field of Classification Search
CPC ......... G06F 17/30427; G06F 17/30448; G06F 17/30867; G06F 17/3053; G06F 17/30477
USPC .................................................. 707/769, 722
See application file for complete search history.

(56) References Cited

U.S. PATENT DOCUMENTS

| | | | |
|---|---|---|---|
| 5,551,027 A * | 8/1996 | Choy et al. | |
| 6,212,514 B1 * | 4/2001 | Eberhard | .......... G06F 17/30463 |
| 6,684,203 B1 | 1/2004 | Waddington et al. | |
| 7,107,262 B2 * | 9/2006 | Dettinger et al. | |
| 7,650,331 B1 | 1/2010 | Dean et al. | |
| 7,761,407 B1 * | 7/2010 | Stern | ................. G06F 17/30324 |
| | | | 707/602 |

(Continued)

OTHER PUBLICATIONS

Prud'hommeaux et al., SPARQL Query Language for RDF W3C Recommendation Jan. 15, 2008, http://www.w3.org/TR/rdf-sparql-query.

(Continued)

*Primary Examiner* — Truong Vo
(74) *Attorney, Agent, or Firm* — Calfee, Halter & Griswold, LLP

(57) ABSTRACT

The invention relates to a method and system that provide a high performance and extremely scalable triple store within the Resource Description Framework (or alternative data models), with optimized query execution. An embodiment of the invention provides a data storage and analysis system to support scalable monitoring and analysis of business processes along multiple configurable perspectives and levels of granularity. This embodiment analyses data from processes that have been already executed and from ongoing processes, as a continuous flow of information. This embodiment provides defining and monitoring processes based on no initial domain knowledge about the process and such that the process will be built only from the incoming flow of information. Another embodiment of the invention provides a grid infrastructure that allows storage of data across many grid nodes and distribution of the workload, avoiding the bottleneck represented by constantly querying a database.

24 Claims, 9 Drawing Sheets

(56) References Cited

U.S. PATENT DOCUMENTS

| | | | | |
|---|---|---|---|---|
| 7,984,043 | B1* | 7/2011 | Waas | 707/718 |
| 8,401,991 | B2* | 3/2013 | Wu et al. | 707/602 |
| 2004/0122845 | A1* | 6/2004 | Lohman et al. | 707/102 |
| 2005/0022115 | A1* | 1/2005 | Baumgartner | G06F 17/30911 715/205 |
| 2006/0218123 | A1* | 9/2006 | Chowdhuri et al. | 707/2 |
| 2006/0235823 | A1* | 10/2006 | Chong et al. | 707/1 |
| 2007/0016558 | A1* | 1/2007 | Bestgen et al. | 707/3 |
| 2007/0185831 | A1* | 8/2007 | Churcher | 707/3 |
| 2009/0138437 | A1* | 5/2009 | Krishnamoorthy et al. | 707/3 |
| 2009/0138498 | A1 | 5/2009 | Krishnamoorthy et al. | |
| 2009/0187542 | A1* | 7/2009 | Begley et al. | 707/3 |
| 2009/0248631 | A1* | 10/2009 | Alba et al. | 707/3 |
| 2010/0036862 | A1* | 2/2010 | Das et al. | 707/101 |
| 2010/0121868 | A1* | 5/2010 | Biannic | G06F 17/3097 707/759 |
| 2010/0250577 | A1* | 9/2010 | Cao | G06F 17/30448 707/760 |
| 2010/0281053 | A1* | 11/2010 | Braines | G06F 17/30545 707/770 |
| 2010/0312762 | A1* | 12/2010 | Yan | G06F 17/30445 707/716 |
| 2011/0055250 | A1* | 3/2011 | Nandy | G06F 17/30592 707/769 |
| 2011/0302164 | A1* | 12/2011 | Krishnamurthy et al. | 707/737 |
| 2012/0066205 | A1* | 3/2012 | Chappell | G06F 17/30451 707/713 |
| 2013/0138626 | A1* | 5/2013 | Delafranier et al. | 707/713 |

OTHER PUBLICATIONS

Cyganiak et al., RDF 1.1 Concepts and Abstract Syntax, W3C Recommendation Feb. 25, 2014, http://www.w3.org/TR/2014/REC-rdf11-concepts-20140225/.
Sesame 2.x official User Guide for Sesame: http://openrdf.callimachus.net/sesame/2.7/docs/users.docbook?view#Introduction, accessed Jul. 16, 2014.
Jena—A Semantic Web Framework for Java http://jena.apache.org/documentation/rdf/, accessed Jul. 16, 2014.
Oracle Database Semantic Technologies http://docs.oracle.com/cd/E11882_01/appdev.112/e11828/sdo_rdf_concepts.htm#CIHECGII (section 1.1, 1.2, 1.3), Copyright 2005, accessed Jul. 16, 2014.
BigOWLIM—OWL Semantic Repository http://owlim.ontotext.com/display/OWLIMv54/OWLIM-SE+Usage+Scenarios, last edited Aug. 30, 2012.
AllegroGraph RDFStore Web 3.0's Database: http://franz.com/agraph/support/documentation/current/agraph-introduction.html#ai-overview, last updated Jun. 4, 2014.
Harris et al., SPAQRL 1.1 Query Language, W3C Recommendation Mar. 21, 2013, http://www.w3.org/TR/sparql11-query/.
Tsc User Guide, v1.3, Aug. 13, 2009, http://tsc.sti2.at/.
Kaoudi, Z.; Kyzirakos, K. & Koubarakis, M. (2010), SPARQL Query Optimization on Top of DHTs., in Peter F. Patel-Schneider; Yue Pan; Pascal Hitzler; Peter Mika; Lei Zhang 0007; Jeff Z. Pan; Ian Horrocks & Birte Glimm, ed., 'International Semantic Web Conference (1)', Springer, pp. 418-435, http://www.academia.edu/383983/SPARQL_Query_Optimization_on_Top_of_DHTs.
Fensel, D.; van Harmelen, F. & Andersson, B. (2008), Towards LarKC: A Platform for Web-Scale Reasoning, in 'ICSC', IEEE Computer Society, pp. 524-529, http://www.larkc.eu/wp-content/uploads/2008/05/larkc-icsc08.pdf.
Zeyliger—How Raytheon BBN Technologies Researchers Are Using Haddop to Build a Scalable, Distributed Triple Store, Mar. 22, 2010, SHARD http://www.cloudera.com/blog/2010/03/how-raytheon-researchers-are-using-hadoop-to-build-a-scalable-distributed-triple-store/.
International Search Report for International Patent Application Serial No. PCT/GB2012/053077 dated Mar. 6, 2013.
Written Opinion for International Patent Application Serial No. PCT/GB2012/053077 dated Mar. 6, 2013.
Documentation—4store, http://4store.org/trac/wiki/Documentation, accessed Aug. 11, 2014.
B. Paul Jenq et al. "Query Processing in Distributed ORION", Advances in Database Technology EDBT'90, pp. 169-187, Springer Berlin, Mar. 1990.
Cyrus Soleimany et al. "Performance of a distributed architecture for query processing on workstation clusters", Future Generations Computer Systems, vol. 19 No. 4, pp. 463-478, Elsevier Science, May 4, 2003.

* cited by examiner

Figure 9

METHOD AND SYSTEM FOR PROCESSING DATA QUERIES

FIELD OF THE INVENTION

The present invention relates to a method and system for processing data queries. It is particularly, but not exclusively, concerned with methods and systems for processing queries relating to data stored in a distributed fashion across several nodes.

BACKGROUND OF THE INVENTION

Business Process Mining (BPM) is an increasingly critical area of information technology, helping businesses to leverage their resources for maximum benefit. It is an important part of Business Process Management that allows companies to analyze their processes based on actual data collected from their systems. The goal is to enable companies to adapt quickly to changing business conditions. BPM improves the speed of process analysis by automatically generating real-time process models from existing systems logs, event logs, database transactions, audit trail events or simple management information. By linking information from these sources it allows instant analysis of the business processes generating interactive visual displays of how the process works and shows how specific case characteristics influence processing times.

Process Mining can dramatically accelerate a business' discovery process. A mined process model gives users a unique insight, showing the actual underlying process model and a fascinating insight into how work is actually flowing through the business.

Existing BPM systems however fall short of their promise. They tend to be restricted in the kind of data they can analyse and can sometimes put restrictions on the data model itself. Furthermore, the kind of analysis that can be performed is normally restricted to an inextensible and inflexible set of functions because these are closely tied to the data model being used.

Most of the business processes, in state-of-the-art systems, are modelled using expressive representations that can be easily enacted in the enterprise. Usually, at the same time, a comprehensive set of KPIs, SLAs and other formalisms, oriented towards analyzing the company's performance and behaviour, are defined and constantly monitored.

This approach is promising and efficient for a fully automated process. However, the same cannot be said for processes involving a high number of uncontrolled variables such as human actors, unpredictable events (e.g. weather, accidents), other tasks (agreements in the form of contract) that do not behave as expected (e.g. tasks not executed or some procedure is not followed). Such information cannot easily be captured or represented in the process model.

In such situations, if the performance is monitored by analysing the "expected" process model, the KPIs can give a distorted view of reality because they are analyzing an "ideal" process model that may actually never have existed in the organisation. Furthermore, sometimes processes are implicitly executed even if they have never been formally defined. Obtaining incorrect indications will lead to incorrect actions that can affect the overall performance of the company.

Therefore, it is important to perform analysis of process models created from real data and from real interactions by building the model from a flow of information reflecting real actions and, not from a pre-defined model.

Current technology typically requires the translation or import of data into the system before it can be analysed. This imposes severe constraints on the way the data is defined and collected. Limitations are also imposed by predefined database schemas that are neither flexible, nor easily extensible. This means that new information cannot easily be captured by the system without significant modifications. The scope for analysis and information extraction is hence severely limited.

Moreover, such systems usually suffer from scalability issues, not least because the database itself becomes the bottleneck when a large number of requests are executed against it. The use of databases also makes real-time updates of data very difficult.

In the following section, we describe existing work that mainly focuses on the current generation of triple stores.

Triple Stores

This data model is based on the Resource Description Framework (RDF) [2]. An RDF-based data model is generally more naturally suited to representing continuously evolving and unpredictable types of knowledge.

The atomic element of an RDF-based data model is a triple, which is composed of three mandatory parts. Sometimes, to this basic set of information, some systems add the name of the graph (i.e. the namespace), timestamps and other attributes. A set of triples defines the RDF graph. An RDF graph is a multi-labelled, oriented graph. At its most basic, a triple store is a system that provides the ability to store a RDF graph and a query interface (traditionally SPARQL (SPARQL Protocol and RDF Query Language [1]) to the graph.

A large number of triple stores are available both commercially, open source and in literature. The best known are Sesame [3] and Jena [4]. These are general-purpose platforms usually offering a query engine interface and parsing a query defined using SPARQL standard definitions.

The triple stores currently available can be broadly divided into centralized and distributed approaches. The centralized approaches include Sesame and Jena. However, both have also been reused and extended in some distributed approaches. Other distributed approaches include a wide variety of commercial solutions such as Oracle Database 11 g Semantic Technologies [5], BigOWLIM [6], AllegroGraph [7] and 4Store [8] which have been used in many applications.

To answer queries in a triple store means resolving conjunctive queries over the RDF Graph in the store. There are several query languages used for the triple stores. The frequently used and most expressive is SPARQL (now also the 1.1 extension [9] is under standardization by the World Wide Web Consortium (W3C)).

Due to the highly interconnected nature of RDF graphs, the storage of data and query processing are extremely demanding in terms of space and computational power. Therefore centralized solutions are now showing their limits and are getting progressively replaced by distributed applications that are able to scale the RDF graph, albeit at the expense of more computational power. However, distributed approaches also introduce several new problems, the main one being the execution of the join operations in answering conjunctive queries.

Distributed solutions are, at the moment, limited to peer to peer (P2P) or overlay networks (Tsc++[10], Atlas [11]), and DHTs or MapReduce [12]. (LarKC [13], SHARD [14]). The main feature of these systems is that, since they are built on top of a distributed architecture, they can be (more or less) easily extended according to the requirement of a particular application.

This is indeed a fundamental feature for applications that have to process quickly a huge amount of data, especially considering also that ontological data can have a dimensionality of billions of instances. However, at the moment, performance is comparable to centralized triple-stores.

Within the P2P approaches, the main players are Tsc++, which is based on the triple space computing paradigm, and Atlas which is based on decentralized indexing of the triples. Both approaches rely on P2P networks and they are designed not as a persistent triple store but as a metadata repository for web service descriptions. Therefore these systems address a different problem to those underlying the present invention.

The LarKC and SHARD projects have developed two approaches based on distributed hash tables. LarKC stands for Large Knowledge Collider and is a publicly funded project from the European Union under the FP7 Framework. LarKC is a plug-in based framework for the processing of Semantic web data. Processes are defined as workflow of basic operations, which are:

Identify: where do the axioms and data come from that contribute to a solution?
Transform: how to abstract that information into the forms needed by further heterogeneous components?
Select: which part of knowledge & data is required?
Decide: when is an answer "good enough" or "best possible" for a specific purpose?
Reason: what can be derived from information automatically, using deductive, non-deductive inference, etc.

Each operation in the project is defined as an interface that is implemented by a specific plugin. The standard distribution of LarKC includes a select plug-in based on the Map/Reduce paradigm. The Map/Reduce approach is also used by SHARD project.

Map/Reduce is a two-step approach that allows high scalability and parallelization of the query execution. The problem with Map/Reduce approaches is that there is no communication between nodes, therefore their performance is determined heavily by the data partitioning used. The data insertion and query process have to make implicit assumptions about where the data is stored (also called a partition step). Since there is no communication between nodes, each node runs its query highly independently, without using any relevant or potentially useful information from the other nodes or data partitions. This means that, especially with big datasets, a huge amount of information is often retrieved in the intermediate steps, when only a subset would have been relevant.

Accordingly, the main problems with existing peer to peer solutions include:

Scalability: the peer to peer systems are not scalable and data is replicated. Each triple that is inserted in the system is stored in multiple peers. This is a problem that is also shared by the Map/Reduce approach, where in cases of high frequency of a predicate, subject or object some nodes may be overloaded.

Failover mechanisms: due to the peer to peer nature of the approach the triples are replicated in some nodes. But in case of the failure of nodes, the triples are not recovered.

Based on P2P/Overlay networks. Nodes do not share data and all communication is via messages. This normally means that intermediate results are communicated to a common node that performs the join operation. There will typically be several join operations in a single query execution as intermediate results are merged together. In some cases, this means that network communication can be a problem.

On the other hand the Map/Reduce approach relies heavily on the partitioning of the data. In a triple store it is possible to make "realistic" assumptions about where data will be stored based on the predicate, object and subject type of the triple, typically in that order. However these assumptions vary drastically depending on the application. Most systems using the Map/Reduce approach will rely heavily on this partitioning step. It is also very hard to dynamically repartition data in situations where the initial partitioning assumption is not efficient anymore.

The query algorithms used in Map/Reduce approaches are also heavily dependent on how data is partitioned. Any partitioning algorithm used could speed up one type of query significantly but greatly reduce the performance of another. Also, because there is no communication between nodes, each node runs its atom (also called query clause in some systems) without relevant information from the other atom(s) which means huge datasets are generated when only a subset would have been relevant.

Many enterprises have business models that are highly dependent on processes that are executed both in good time (meeting Cycle Time measures) and correctly with minimal failures and repeats (meeting Right First Time measures). In such large organisations, in order to support the business in managing and improving processes across different systems and divisions, solutions are required that can analyse different forms of business process data in order to determine the real state of execution of the processes and evaluate accurately the performance measures associated with them. As automation is becoming an increasingly ubiquitous feature of process execution, there is a growing need for capabilities of monitoring and analysis that can, firstly, cope with the large amount of data generated during the process life spans and, secondly, is able to provide alarms very rapidly when risks of failures are detected.

Thus it is an object of the present invention to provide methods and systems which allow the analysis and monitoring of process execution using the latest, most up-to-data available. A further object of the present invention is to provide an approach which is completely data-driven and does not rely on a predefined model for information extraction.

The primary distributed computing technology used by triple stores and query engines is Hadoop, and similar Map/Reduce middleware, that demand run-once semantics. Real-time data streams typically require that the data is updated and written to file between rounds of execution, and then loaded back into memory. This makes handling real-time data very difficult, if not impossible. Thus it is an object of the present invention to provide a system which can allow a query to be activated as more data becomes available without requiring such expensive data update operations.

SUMMARY OF THE INVENTION

An exemplary method of the present invention provides a method of processing a query on a data set stored on a plurality of nodes, the method including the steps of: dividing the query into one or more atoms which define individual queries on the data set; calculating the execution cost of each atom in the query; determining one or more query paths which set out an order in which one or more atoms are to be executed using said calculated execution costs and interdependence between said atoms; determining a query execution plan which is a set of said query paths which can be executed in parallel; executing said atoms on each of said nodes in accordance with said query execution plan; combining the results of each query path to produce a result set that is the answer to said query.

A further exemplary aspect of the present invention provides a system for storing business process data, the system having a plurality of nodes which are connected to each other via a network, each node having a data storage and a data processing device, wherein: the system stores business process data as a data set in a distributed fashion on the data storages of the plurality of nodes; and the data processing device of each node is arranged to processing a query on the data set by: dividing the query into one or more atoms which define individual queries on the data set; calculating the execution cost of each atom in the query; determining one or more query paths which set out an order in which one or more atoms are to be executed using said calculated execution costs and interdependence between said atoms; determining a query execution plan which is a set of said query paths which can be executed in parallel; executing said atoms on each of said nodes in accordance with said query execution plan; and combining the results of each query path to produce a result set that is the answer to said query.

BRIEF DESCRIPTION OF THE DRAWINGS

Embodiments of the invention will now be described by way of example with reference to the accompanying drawings in which:

FIG. 9 shows the final operation to combine results from different query paths.

DETAILED DESCRIPTION

Figure 1:
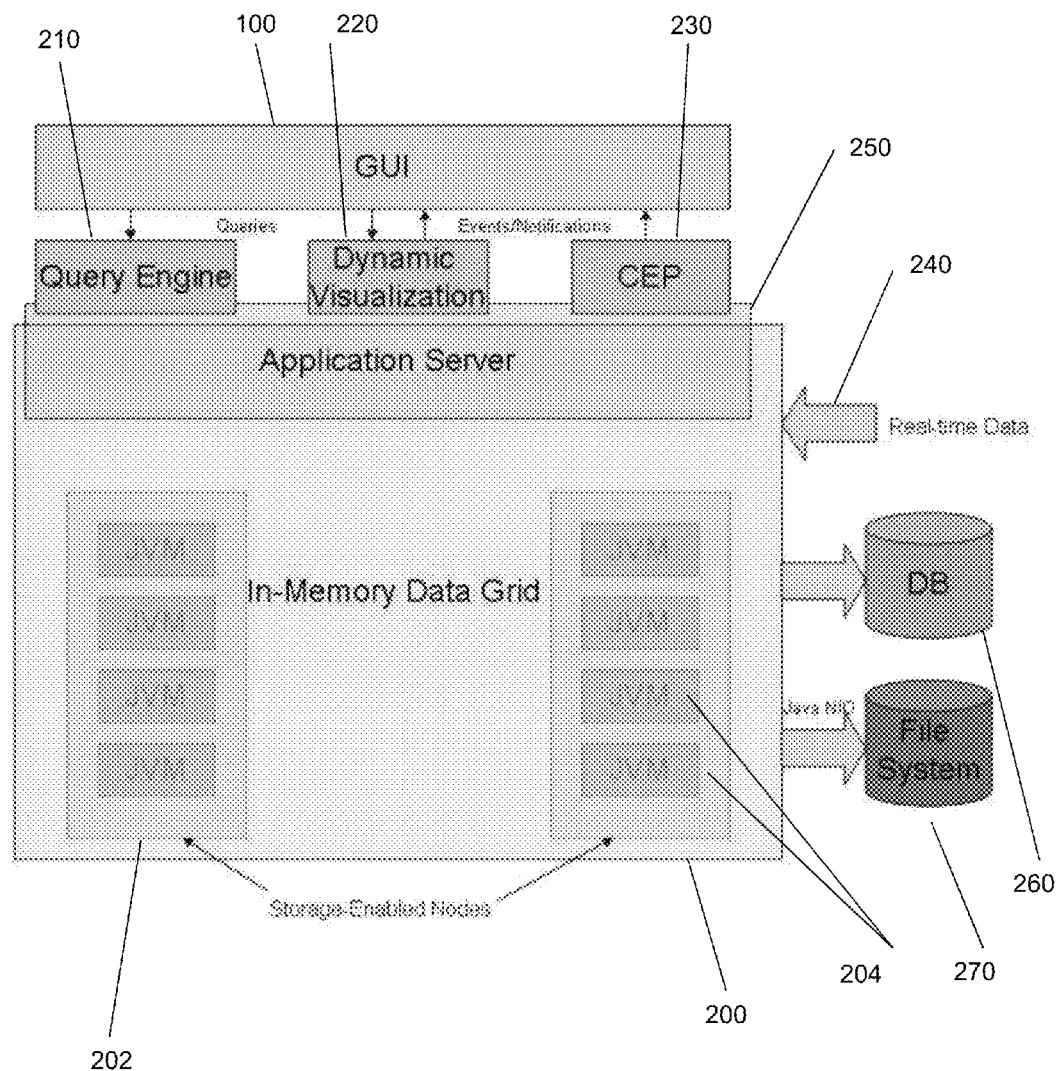
FIG. 1 shows an overview of the system architecture of an embodiment of the present invention.

Aspects of the present invention seek to provide methods and systems for processing queries on data sets.

The aspects of the present invention seek to provide methods and systems which are flexible and scalable with regards to data collection and analysis. The aspects of the present invention also seek to provide methods and systems which reduce latency and improve search performance.

Aspects of the invention seek to provide a data storage and analysis system to support scalable monitoring and analysis of business processes along multiple configurable perspectives and levels of granularity. Preferably they also provide for analysis of data from processes that have been already executed and from on-going processes, as a continuous flow of information.

With respect to the classical business process mining tools, the focus of the aspects of the invention is on the efficient and scalable analysis of process flow, for example expressed in the flexible and expressive RDF-based triple format, both for processes that have already finished execution and realtime process updates.

Preferably these objectives are achieved by methods and systems which divide up queries for parallel processing across different nodes of a system and which seek to execute portions of queries in an order which takes account of the execution cost of those portions.

In general terms, aspects of the present invention provide a high-performance data store and a query engine/method.

Accordingly, at its broadest, a first aspect of the present invention provides a method of processing a query which includes calculating execution cost of atoms within an overall query and determines the execution order of those atoms based on the calculated execution cost and/or the possibility of processing one or more atoms in parallel.

A first aspect of the present invention preferably provides a method of processing a query on a data set stored on a plurality of nodes, the method including the steps of: dividing the query into one or more atoms which define individual queries on the data set; calculating the execution cost of each atom in the query; determining one or more query paths which set out an order in which one or more atoms are to be executed using said calculated execution costs and interdependence between said atoms; determining a query execution plan which is a set of said query paths which can be executed in parallel; executing said atoms on each of said nodes in accordance with said query execution plan; combining the results of each query path to produce a result set that is the answer to said query.

Preferably the method of this aspect relies on standard messaging and web services data interface techniques which are adopted widely. This allows the methods of the invention to be embedded directly into existing IT systems that are responsible for the process management activities with minimal disruption.

Preferably the method of this aspect makes use of the SPARQL query engine which is well known.

Existing distributed query engines (including the SPARQL engines referred to previously) run query patterns or atoms in several stages, normally combining results from each stage using a join operation. There is usually little or no communication between the nodes in a single stage. A query execution usually involves several stages and corresponding join operations.

The method of the present aspect can use pattern/atom dependencies and information flow between atoms to effectively perform an "implicit join" between related atoms. All atoms can therefore be submitted for execution in a single stage where dependencies are resolved during execution. The query generally completes with a single, final join operation which creates the result set. This can lead to significant performance gains.

The method of the present aspect also makes no assumptions about the data locality and storage and is arranged to determine at runtime what the most optimal strategy is. Furthermore, the scalability of the present aspect can be achieved by executing certain patterns or atoms on the "local" grid nodes and feeding this information downstream to the other atoms, thereby "implicitly" dividing the data set or relevant universe between the resources, rather than by pre-determined data partitioning. This is in contrast to the SPARQL engines discussed previously, which tend to use pre-defined data partitioning and clustering algorithms to distribute workloads and make their solutions scalable. However, workload analysis and suitable data partitioning can also be used in the present aspect further improve performance in some cases.

Although the method of the present aspect was developed in the context of BPM, it is a general purpose method that can be used in relation to any semantic data where provision of a scalable method of processing queries is desired.

The method is preferably implemented on a grid infrastructure that allows the storage of data across many grid nodes and the corresponding distribution of the workload, avoiding the bottleneck represented by constantly querying a database. This allows efficient analysis of a large amount of data.

The implementation on a grid infrastructure also enables parallel queries across the nodes. This makes the system inherently scalable simply by adding more compute and data nodes to the cluster. The database therefore ceases to be the bottleneck.

Preferably the data set stores the data as triples comprising a subject, a predicate and an object, wherein the subject and object are variables and the predicate describes the relationship between the subject and the object.

The data set preferably uses an ontology-based representation to describe process data in an open, flexible and extensible manner.

The use of a semantic data model and data grid technology means that the method can be extremely flexible and scalable with regards to data collection and analysis. Data can be captured as semantically defined triples with no bounds imposed on what can be stored in this format. This allows very powerful analysis and information extraction paradigms to be implemented, leveraging data grid technology and multiple compute and storage nodes. The use of distributed data storage technology can also reduce latency and improve performance considerably. Tests have shown that the method as implemented in the embodiment set out below can offer significant speedups for query execution, greatly enhancing the promise of semantic web technology.

The method preferably further includes the step of storing data into the data set.

In particular embodiments, the step of storing data includes the step of converting the data in each triple from character strings to numeric representations. In one configuration, the numeric representations are sequence numbers.

A preferred approach to storing the data includes the sub-steps of: parsing data to be stored to determine a triple containing character strings; comparing each of said character strings against a plurality of stored character strings and their associated sequence numbers; if a character string matches a stored character string, using the sequence number associated with said stored character string to replace the character string in the triple; if a character string does not match any stored character string, obtaining a new sequence number, replacing the character string in the triple with said new sequence number and storing said character string associated with said new sequence number; and storing said triple.

Existing Business Process Mining systems and methods generally require significant pre-processing of incoming data before it can be analysed and stored. The above method requires minimal pre-processing, i.e. the translation of term values or strings to integer lookup values. The data can therefore be stored right away in the underlying storage system. This can also enable the method of this aspect to incorporate realtime updates, or near realtime updates, to the data.

This allows queries to be activated as more data becomes available without requiring the data to be written to file between rounds of execution and then loaded back into memory.

Where a query path contains a plurality of atoms, when said step of executing is performed for an atom which is not a first atom in a query path, said atom is preferably only executed on the results of previously executed atoms in the query path.

This "implicit join" shares information between atoms, which means that intermediate result sets are usually smaller and only one final join is used instead of many levels of joins.

Further, where the size of results from an atom exceeds a predetermined threshold, a subset of the results from said atom may be passed to the subsequent atom or atoms in the query path before the execution of said atom is completed.

As the method of the present aspect preferably uses a data grid system where communication between nodes and retrieval of data from remote nodes is possible, it is able to use several optimisations which the Map/Reduce type of algorithms known in existing distribute SPARQL query engines (where communication between nodes is limited or non-existent) cannot, e.g. using partial execution results to limit the scope of the query and optimise execution.

Preferably the calculation of the execution cost for each atom is carried out by assessing the number of instances in said data set of one or more constants contained within said atom. This may be done by referring to an index file which stores the number of such instances for all such constants, or for the most commonly used constants, or for those constants for which this information has previously been retrieved.

In one embodiment of the present aspect, the calculation of the execution cost is carried out by determining, for each atom, a weight, which for an atom $i(j, k, l)$ is $$W(j_i, k_i, l_i) = \min\{\text{wgt}(j_s), \text{wgt}(k_p), \text{wgt}(l_o)\}$$

where $\text{wgt}(x_{pos})$ is the number of matching triples with value x in the subject, predicate or object position pos if x is a constant, or the total size of the data set if x is a variable, and s, p and o are the subject, predicate and object positions respectively.

In one embodiment of the present aspect, a query path is determined by: setting the atom with the lowest execution cost as the first atom in the path; setting as a subsequent atom in the path an atom which is dependent on said first atom in that it shares one or more variables with said first atom; and repeating until all atoms which are dependent on the first atom or any subsequent atoms have been set in the path.

By setting the atom with the lowest execution cost as the first atom in the path and then setting atoms which share one or more variables with that first atom, the result set to be considered by the subsequent atoms is reduced (due to the restrictions on the shared variable(s) imposed by the execution of the first atom) and preferably minimised, with corresponding benefits in processing time and resources. Corresponding benefits can be achieved for the subsequent atoms if they also have dependencies.

Where there is a plurality of atoms which are dependent, the subsequent atoms can be set in order of execution cost of those atoms. Thus the advantages of performing lower execution cost atoms first can be repeated through execution of subsequent atoms.

In many cases a query path will contain atoms which can be executed in parallel to each other as well as atoms which can be executed sequentially. Such atoms can then be executed in parallel, for example using a multi-threaded processor.

Preferably the step of executing includes executing the first atom in a query path on each node only in respect of data stored on said node. Typically the data is stored in a distributed fashion across the nodes. Accordingly, by executing the first atom in any query path only on the data stored on that node, the processing of the query path on each node can be limited to local data. This avoids duplication of effort and results between execution of the query paths on the different nodes.

If the data is randomly assigned to the different nodes, this approach will generally result in approximately uniform distribution of the workload of atom execution across the nodes.

Subsequent atoms are therefore preferably executed against the entire data set, but will be limited by the results of the first atom.

Some queries may include a filter which is a limit on the value of one or more variables in the data set. In this situation the step of dividing preferably further includes assigning said filter to each of the atoms which relate to said variables.

If the filter in question is disjunctive, the method may include the further steps of: determining whether it is possible to assign said filter as a whole to an atom which features all of the variables in the filter, and if so, assigning it to all such atoms; if it is not possible to so assign said filter, dividing said filter into a plurality of conjunctive filters and assigning a query path to each of said conjunctive filters.

Finally if a filter cannot be assigned to any atom, then it may be applied to the results of the step of combining.

From the point of view of the data analysis, the present invention seeks to provide a model that is at the same time simple and flexible. Many formal models used to define and monitor processes exist. However, embodiments of the present invention work on the underlying assumption that no domain knowledge about the process exists initially and that the process will be built only from the incoming flow of information. This is an innovative approach that allows data to dynamically define the process model.

Embodiments of this first aspect may include some, all or none of the above described optional or preferred features.

At its broadest, a second aspect of the present invention provides a system for storing business process data in a distributed fashion and processing queries on that data in a manner which takes account of the execution cost of each part of a query and the possibility of processing parts of queries in parallel.

Accordingly a second aspect of the present invention preferably provides a system for storing business process data, the system having a plurality of nodes which are connected to each other via a network, each node having a data storage and a data processing device, wherein: the system stores business process data as a data set in a distributed fashion on the data storages of the plurality of nodes; and the data processing device of each node is arranged to processing a query on the data set by: dividing the query into one or more atoms which define individual queries on the data set; calculating the execution cost of each atom in the query; determining one or more query paths which set out an order in which one or more atoms are to be executed using said calculated execution costs and interdependence between said atoms; determining a query execution plan which is a set of said query paths which can be executed in parallel; executing said atoms on each of said nodes in accordance with said query execution plan; combining the results of each query path to produce a result set that is the answer to said query.

Preferably the system of this aspect includes standard messaging and web services data interface techniques which are adopted widely. This allows this aspect to be embedded directly into existing IT systems that are responsible for the process management activities with minimal disruption.

Preferably the system of this aspect makes use of the SPARQL query engine which is well known.

Existing distributed query engines (including the SPARQL engines referred to previously) run query patterns or atoms in several stages, normally combining results from each stage using a join operation. There is usually little or no communication between the nodes in a single stage. A query execution usually involves several stages and corresponding join operations.

The system of the present aspect can use pattern/atom dependencies and information flow between atoms to effectively perform an "implicit join" between related atoms. All atoms can therefore be submitted for execution in a single stage where dependencies are resolved during execution. The query generally completes with a single, final join operation which creates the result set. This can lead to significant performance gains.

The system of the present aspect also makes no assumptions about the data locality and storage and is arranged to determine at runtime what the most optimal strategy is. Furthermore, the scalability of the present aspect can be achieved by executing certain patterns or atoms on the "local" grid nodes and feeding this information downstream to the other atoms, thereby "implicitly" dividing the data set or relevant universe between the resources, rather than by pre-determined data partitioning. This is in contrast to the SPARQL engines discussed previously, which tend to use pre-defined data partitioning and clustering algorithms to distribute workloads and make their solutions scalable. However, workload analysis and suitable data partitioning can also be used in the present aspect further improve performance in some cases.

Although the system of the present aspect was developed in the context of BPM, it is a general purpose method that can be used in relation to any semantic data where provision of a scalable method of processing queries is desired.

The system is preferably implemented on a grid infrastructure that allows the storage of data across many grid nodes and the corresponding distribution of the workload, avoiding the bottleneck represented by constantly querying a database. This allows efficient analysis of a large amount of data.

The implementation on a grid infrastructure also enables parallel queries across the nodes. This makes the system inherently scalable simply by adding more compute and data nodes to the cluster. The database therefore ceases to be the bottleneck.

The data set preferably stores the data as triples comprising a subject, a predicate and an object, wherein the subject and object are variables and the predicate describes the relationship between the subject and the object and at least one of the data processing devices is arranged to converting the data in each triple from character strings to numeric representations prior to storing the data.

The data set preferably uses an ontology-based representation to describe process data in an open, flexible and extensible manner.

The use of a semantic data model and data grid technology means that the method can be extremely flexible and scalable with regards to data collection and analysis. Data can be captured as semantically defined triples with no bounds imposed on what can be stored in this format. This allows very powerful analysis and information extraction paradigms to be implemented, leveraging data grid technology and multiple compute and storage nodes. The use of distributed data storage technology can also reduce latency and improve performance considerably. Tests have shown that the method as implemented in the embodiment set out below can offer significant speedups for query execution, greatly enhancing the promise of semantic web technology.

In order to store data into the data storages, the data processing device is preferably arranged to monitor business process messages and to: parse data to be stored to determine a triple containing character strings; compare each of said character strings against a plurality of stored character strings and their associated sequence numbers; if a character string matches a stored character string, use the sequence number associated with said stored character string to replace the character string in the triple; if a character string does not match any stored character string, obtain a new sequence number, replacing the character string in the triple with said new sequence number and storing said character string associated with said new sequence number; and store said triple.

Existing Business Process Mining systems and methods generally require significant pre-processing of incoming data before it can be analysed and stored. The above approach requires minimal pre-processing, i.e. the translation of term values or strings to integer lookup values. The data can therefore be stored right away in the underlying storage system. This can also enable the method of this aspect to incorporate realtime updates, or near realtime updates, to the data.

This allows queries to be activated as more data becomes available without requiring the data to be written to file between rounds of execution and then loaded back into memory.

Where a query path contains a plurality of atoms, when said step of executing is performed for an atom which is not a first atom in a query path, said atom is preferably only executed on the results of previously executed atoms in the query path.

This "implicit join" shares information between atoms, which means that intermediate result sets are usually smaller and only one final join is used instead of many levels of joins.

Further, where the size of results from an atom exceeds a predetermined threshold, a subset of the results from said atom may be passed to the subsequent atom or atoms in the query path before the execution of said atom is completed.

Preferably the data processing device calculates the execution cost for each atom by assessing the number of instances in said data set of one or more constants contained within said atom. This may be done by referring to an index file which stores the number of such instances for all such constants, or for the most commonly used constants, or for those constants for which this information has previously been retrieved.

In one embodiment of the present aspect, the calculation of the execution cost is carried out by determining, for each atom, a weight, which for an atom i(j, k, l) is $$W(j_j, k_j, l_j) = \min\{wgt(j_s), wgt(k_p), wgt(l_o)\}$$

where $wgt(x_{pos})$ is the number of matching triples with value x in the subject, predicate or object position pos if x is a constant, or the total size of the data set if x is a variable, and s, p and o are the subject, predicate and object positions respectively.

In one embodiment of the present aspect, the data processing device determines a query path by: setting the atom with the lowest execution cost as the first atom in the path; setting as a subsequent atom in the path an atom which is dependent on said first atom in that it shares one or more variables with said first atom; and repeating until all atoms which are dependent on the first atom or any subsequent atoms have been set in the path.

By setting the atom with the lowest execution cost as the first atom in the path and then setting atoms which share one or more variables with that first atom, the result set to be considered by the subsequent atoms is reduced (due to the restrictions on the shared variable(s) imposed by the execution of the first atom) and preferably minimised, with corresponding benefits in processing time and resources. Corresponding benefits can be achieved for the subsequent atoms if they also have dependencies.

Where there is a plurality of atoms which are dependent, the subsequent atoms can be set in order of execution cost of those atoms. Thus the advantages of performing lower execution cost atoms first can be repeated through execution of subsequent atoms.

In many cases a query path will contain atoms which can be executed in parallel to each other as well as atoms which can be executed sequentially. Such atoms can then be executed in parallel, for example using a multi-threaded processor.

Preferably the step of executing includes executing the first atom in a query path on each node only in respect of data stored on said node. Typically the data is stored in a distributed fashion across the nodes. Accordingly, by executing the first atom in any query path only on the data stored on that node, the processing of the query path on each node can be limited to local data. This avoids duplication of effort and results between execution of the query paths on the different nodes.

If the data is randomly assigned to the different nodes, this approach will generally result in approximately uniform distribution of the workload of atom execution across the nodes.

Subsequent atoms are therefore preferably executed against the entire data set, but will be limited by the results of the first atom.

Embodiments of this second aspect may include some, all or none of the above described optional or preferred features.

Embodiments of this second aspect preferably operate by carrying out a method according to the above first aspect, which may include some, all or none of the above described optional or preferred features of that aspect.

In general terms a third aspect of the present invention provides a data model having features especially designed for resource description which bounds the definition of the model to a labelled oriented multi-graph (every namespace identifies a single graph).

A third aspect of the present invention provides a data structure which stores business process data as triples comprising a subject, a predicate and an object, wherein the subject and object are variables and the predicate describes the relationship between the subject and the object.

Preferably each triple is made up of numeric representations which are cross referenced to character strings of the original data. In one embodiment, these numeric representations are sequence numbers.

In a particular embodiment, the triples are formed by: parsing data to be stored to determine a triple containing character strings; comparing each of said character strings against a plurality of stored character strings and their associated sequence numbers; if a character string matches a stored character string, using the sequence number associated with said stored character string to replace the character string in the triple; if a character string does not match any stored character string, obtaining a new sequence number, replacing the character string in the triple with said new sequence number and storing said character string associated with said new sequence number; and storing said triple.

A fourth aspect of the present invention provides a data storage which is arranged to store business process data as triples comprising a subject, a predicate and an object, wherein the subject and object are variables and the predicate describes the relationship between the subject and the object.

The method of storing the business process data into the data storage is preferably as described as part of the above first aspect, and the data storage is preferably coupled to a data processing device which performs the storing. The data storage may be the data storage in the above second aspect and may have some, all or none of the above described optional or preferred features of that aspect.

The methods, systems and data structures of the present invention are embodied in a system for business process mining using semantic web technology, ontologies, data grids and messaging systems. Such systems enable enterprises to deploy process monitoring software across their organisation and collect and analyse real-time data (e.g. via messaging systems) into a central data grid system. Leveraging the richness of semantically described data, users are able to perform complex analysis on the data set. The system supports real-time updates of data which means that any user queries will return the most recent results at any point in time. Moreover, in case new data is available that satisfies a request from a client, the client can be automatically notified.

FIG. 1 depicts the overall architecture of a system according to an embodiment of the present invention.

The system comprises a GUI 100, an application server 250, and an in-memory data grid 200.

The GUI 100 is a normal graphical user interface which allows a human user to interact with the system, e.g. by submitting queries and viewing the results of queries.

The GUI 100 is connected to the application server 250 through three processes. The query engine 210 translates SPARQL queries input by the user into query objects that can be executed by the application server 250. The dynamic visualisation component 220 translates a user's actions on a graphical representation of the query results on the GUI 100 into query objects that are executed by the application server 250. The CEP (complex events processor) 230 translates a user's generated rules and conditions that will raise alarms into query objects that are executed by the application server 250.

The application server 250 is the main application server that runs the query engine 210, dynamic visualisation component 220 and the CEP 230 and executes query objects on the data grid 200.

The in-memory data grid 200 represents data stored in the memory of the components of a grid made up of a (variable) number of computers (or virtual machines) which are able to communicate and synchronize using network connections. These computers can be visualized as storage nodes 202 having one or more virtual machines (running, e.g. Java) 204.

The real time data 240 represents a stream of new data being sent to the message queue by third party processes.

The in-memory data grid 200 is also connected to a database (DB) 260 which allows in-memory data to be stored in a persistent fashion (e.g. for system re-starts) in a manner which allows fast search throughput but slow write throughput, and to a file system 270 which allows in-memory data to be stored in a persistent fashion in a manner which allows fast write throughput but slow search throughput.

A further embodiment of the present invention provides a SPARQL Query Engine which uses a novel algorithm for distributed query execution that represents a shift from existing distributed query execution systems that rely in most cases on Map/Reduce technology which essentially limits the speedups and flexibility that can be achieved. The method of this embodiment aims to provide a more efficient query engine, which in turn may enable many more future applications in the field of Semantic Web.

Before describing the operation of this embodiment in detail, the data model used by this embodiment to store business process data will be described. Although the implementation described below uses Oracle Coherence as the data grid middleware, the system can also be modified to work with other similar software as will be appreciated by a person skilled in this field.

Data Model

Preferably the data model used in embodiments of the present invention is represented using a formalism that allows an increased degree of flexibility, while at the same time keeping the representation simple so that it can be queried efficiently. Accordingly, ontologies are used to represent the process model.

Ontologies are defined by concepts, attributes of these concepts, relations between concepts and instances of concepts, where each element has its well defined semantic. An example of a typical ontology for business process data is shown in FIG. 2.

Figure 2:
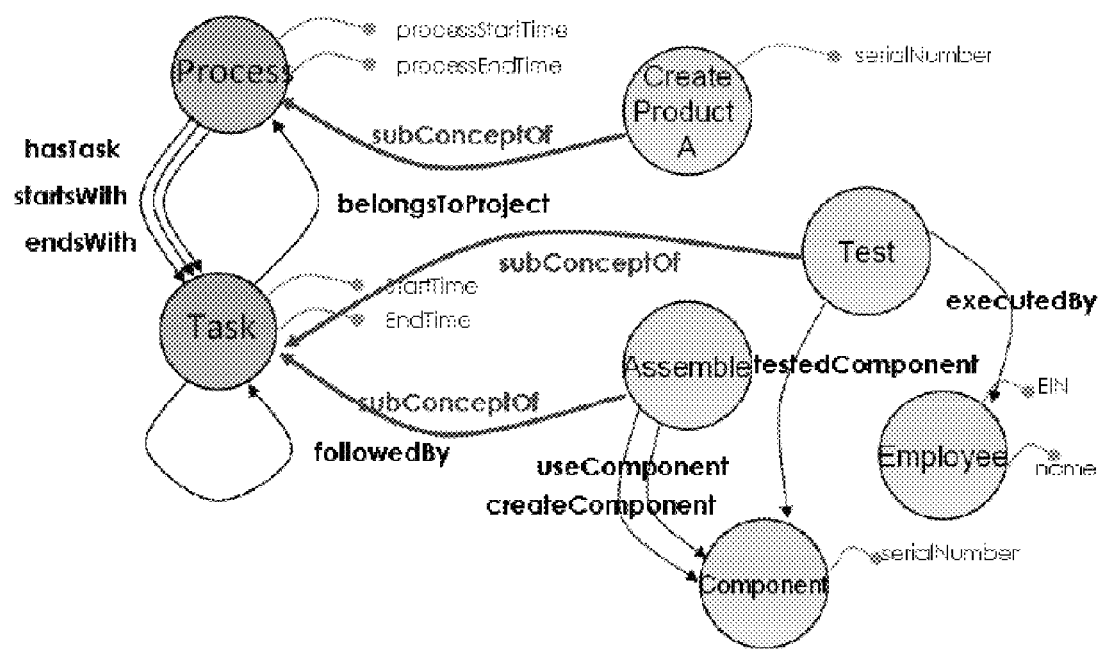
FIG. 2 shows an example of a data model used in embodiments of the present invention.

FIG. 2 illustrates the data model that is used by the CEP and Dynamic Visualization components. Although the query engine proposed in the embodiments below is generic and can work with any graph without previous assumptions, in certain embodiments of the invention where the system is deployed in a business process analysis system, the queries are generated by the Dynamic Visualization and the rules are defined by the CEP.

The two components need to have some "entry point" in the data graph in order to start the analysis. This entry point is made by the concepts "Process" and "Tasks" from FIG. 2, together with the relations "hastasks", "startWith", "endWith", "followedBy" and "BelongsToProject". The concepts have also some attributes: "processStartTime". "processEndTime". "startTime" and "endTime". This basic and extremely generic process model can be extended by as many domain specific models as required. In FIG. 2 an example of such domain specific models is represented, that are linked to the basic model by "subConceptOf" relations. In this way the concepts that extend the basic one ("Create Product A", "Test", "Assemble") inherit all the relations and attributes from the basic model and add new ones: "Serial number"; while "Component" and "employee" are concepts specific of the process domain with their own relations ("UseComponent", "createComponent", "testedComponent" and "executedBy") and attributes ("EIN" and "name").

Ontologies can be represented in several ways. As in the example of FIG. 2 described above, in the present embodiment the ontologies are represented as labelled oriented multi-graphs. In this data model, schema and instance level information coexists in the same space and it is therefore easy to dynamically change the process model (schema level) and the process data (instance-level) seamlessly. Moreover, in the same space multiple process definitions can co-exist. This is an important feature in case of applications that require analysing multi-domain processes and processes spanning across multiple organizations.

The labelled oriented graph representing the ontology that is the data model supporting this embodiment can be formalized as a set of triples: T<s, p, o> (subject, predicate and object). The predicate typically describes the type of relationship between the subject and the object. The type of information that can be modelled in this way is limitless since it is not constrained by pre-defined schemas or data structures. This allows the modelling of complex relationships between process data and model data structures in a flexible, extensible way.

The system models and describes business process information using various concepts such as tasks, sub-processes, start and end times, properties, relationships, workflows etc. The schema that define these constructs can be extended easily and automatically to define new concepts, which is critical as processes evolve to become more complex.

There are several ways in which the system can receive new data. These may include remote process monitors sending data via Java Messaging Service (JMS), web services, etc. Data can also be imported from databases and files using importers adapted for the purpose. The import and process monitoring tools both have access to some form of domain knowledge to be able to ascertain the nature of the data they are receiving. They use this knowledge to convert the data into a more representative format, i.e. RDF-based graphs. The triples assign meaning to the data items, ensuring that they can be universally understood by all applications that also have the relevant domain knowledge.

The information extraction and querying system described below uses the data grid as the backing data store. Since the data grid is constantly receiving new information and updating the distributed data store in real-time, any operation using this embodiment will return the latest results using the latest information, without having to wait for database updates, completion of batch jobs etc.

The triples are represented as data structures containing Uniform Resource Identifiers (URI) and value strings. However, string comparison and storage is inefficient which means that any queries over the triple data model will be quite slow. In the present embodiment it is therefore preferred to convert all triples into an efficient numeric representation which reduces not only the storage requirements but also makes querying and searching more efficient at the expense of a small increase in processing time when the triple is first received by the system. Thus the present embodiment requires minimal pre-processing of data and no expensive import operations, thereby allowing the system to handle real-time updates more easily.

Figure 3:
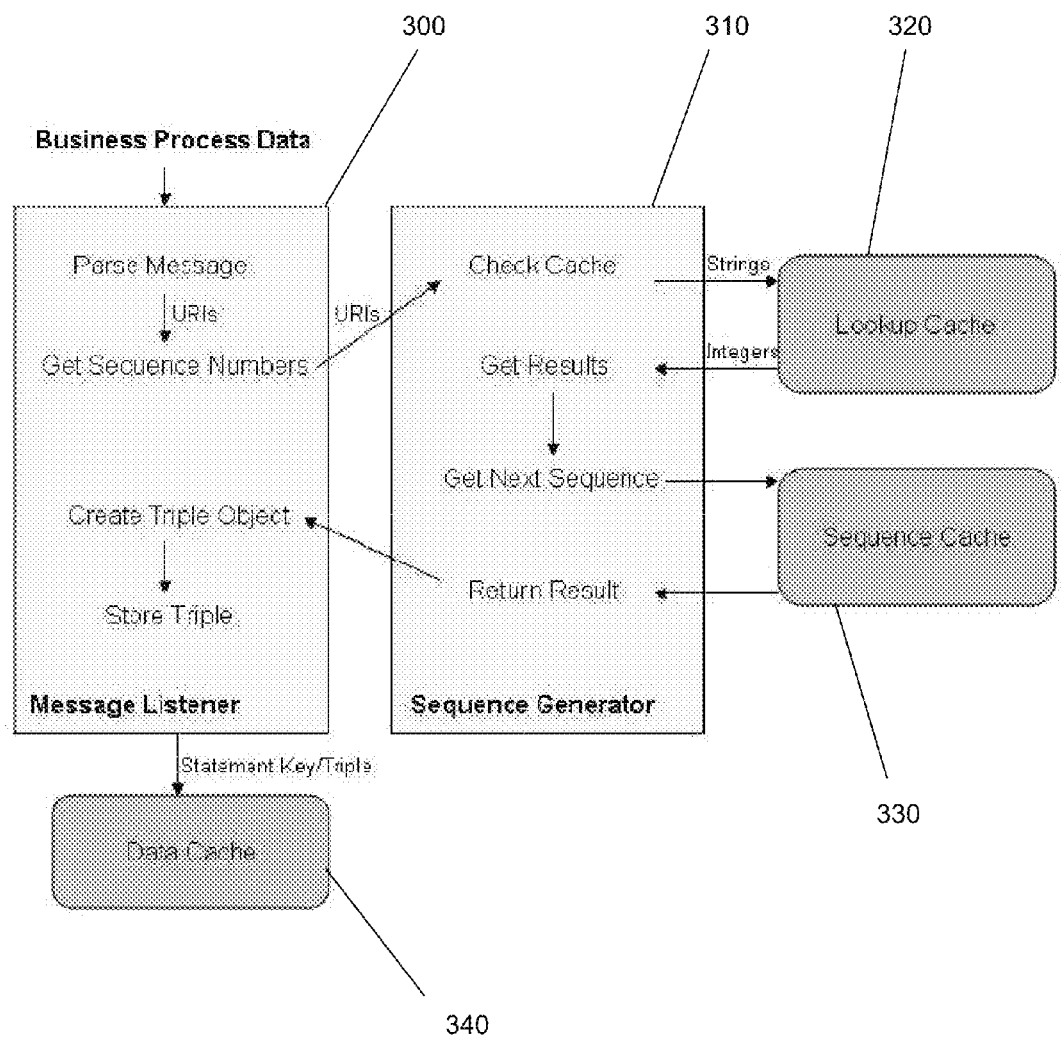
FIG. 3 shows the process of data storage according to an embodiment of the present invention.

FIG. 3 illustrates the processing of data prior to storage. The processing can be viewed as two components, a Message Listener 300 and a Sequence Generator 310, although it will be apparent that these components can be provided as part of a single logical component in implementations of this embodiment, and that, in alternative implementations, the distribution of functions may differ from that shown in FIG. 3 and described below.

The steps in the processing of data are set out in FIG. 3. The Message Listener 300 receives messages containing business process data. Typically the Message Listener 300 will listen to a common message queue where third party processes send process execution data. These messages are interpreted by the listener and parsed to extract the URIs.

The Sequence Generator 310 uses a distributed, in-memory cache 330 to share the next identifier value with all nodes. This is very useful, for example if there are several messaging subsystems or interfaces that are listening to incoming messages from the outside world. The processing and storage of the incoming messages can then be handled more efficiently with the workload being distributed across participating nodes.

Once the message has been parsed in the Message Listener 300, the parsed URIs are transferred to the Sequence Generator 310. The Sequence Generator 310 first checks in Lookup Cache 320 whether the URI has previously been assigned a sequence number. If a URI is already present in the Lookup Cache 320, the sequence number assigned to that URI is retrieved from the cache. If a URI is not present in the Lookup Cache 320, then the Sequence Generator 310 obtains a new sequence number from the Sequence Cache 330. The Sequence Generator 310 then returns the sequence numbers corresponding to the received URIs to the Message Listener 300 which creates a triple comprising the sequence numbers associated with the URIs. Hence, a triple can be uniquely represented by three integer values representing their sequence numbers. Any duplicate triples are discarded at this stage and not inserted into the data store 340. Otherwise, triple objects containing the relevant sequence numbers are stored in the Data Cache 340 by the Message Listener 300.

A further advantage of this approach is that consistency is maintained across the data grid, i.e. if the same value is encountered by multiple nodes, it will be assigned the same sequence number.

Although the above data processing operation has been described in terms of a "Message Listener" which monitors messages within a business process monitoring system, it will be appreciated that a similar approach can be applied to alternative methods of storing data, such as importing data from an existing database.

Scalable SPARQL Query Engine

To understand the process data and extract relevant information from it, users typically define queries in the SPARQL language [1]. The SPARQL language is a standard query language which is based on graph pattern matching. To explain the operation of the present embodiment and how it allows users to extract different kinds of information from the data, several examples of SPARQL queries will be considered.

The query set out below requests the system to return a result set containing nine variables (the nine entries following the "SELECT" clause). Each of these variables is part of one or more query atoms, i.e. descriptions of certain constraints on the data that should be satisfied (the constraints contained within the "WHERE" clause). The query also contains optional atoms that describe constraints that do not necessarily have to be satisfied (headed "OPTIONAL").

```
PREFIX rdf: <http://www.w3.org/1999/02/22-rdf-syntax-ns#>
PREFIX ebtic: <http://org.ebtic.bpm.zeus/processOntology#>
PREFIX etisalat: <http://org.ebtic.bpm.demo#>
SELECT ?processID ?startTime ?endTime ?taskID ?taskType
?taskStartTime ?taskEndTime ?followingTaskID ?preceedingTaskID
WHERE {
  ?processID ebtic:processStartTime ?startTime.
  ?processID ebtic:processEndTime ?endTime.
  ?processID ebtic:hasTask ?taskID.
  ?taskID rdf:type ?taskType.
  ?taskID ebtic:startTime ?taskStartTime.
  ?taskID ebtic:endTime ?taskEndTime.
  OPTIONAL {?taskID ebtic:followedBy ?followingTaskID.}.
  OPTIONAL {?taskID ebtic:precededBy ?preceedingTaskID}.
  FILTER (?processID = etisalat:DemoProcess-8164166017366845606)}
```

The query may also contain filters which are constraints on solutions over the whole group in which the filter appears. The above query contains one such filter (the constraint in the "FILTER" clause). These essentially limit the query results to a subset that matches the filter conditions. These conditions are typically expressed for certain query variables. Variables that are not part of a filter definition can return an unrestricted set of values.

The query, as described above, is the primary method of extracting useful information from a data model. In the following sections, an architecture for executing these queries according to an embodiment of the present invention will be set out. Because the data set can potentially be very large (e.g. in the order of hundreds of millions or billions of triples/data points), the present embodiment sets out a scalable system that can execute the queries quickly and efficiently using distributed computing and storage nodes.

Distributed Query Execution

Figure 4:
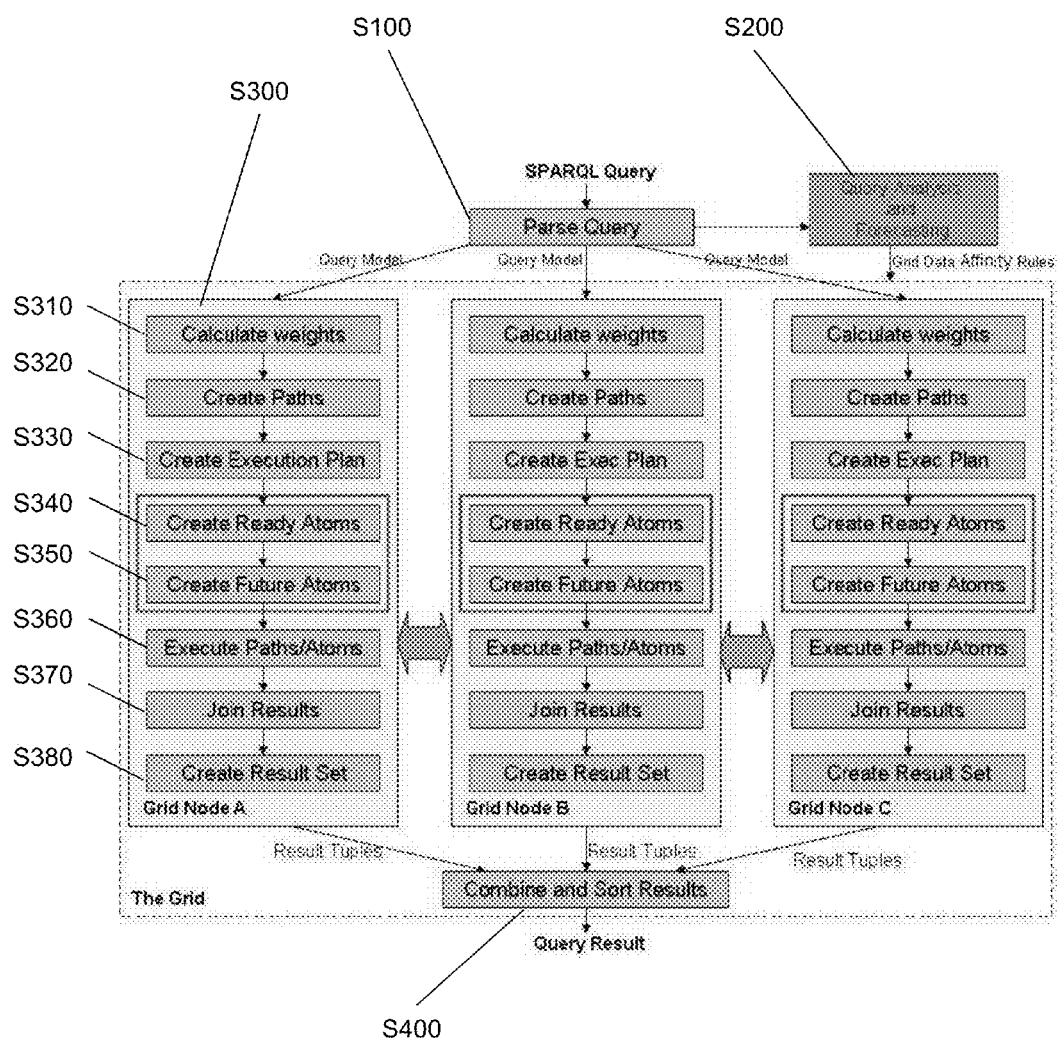
FIG. 4 shows the process of distributed query execution according to an embodiment of the present invention.

FIG. 4 shows, in overview, the process of query execution according to this embodiment. In general terms, the process comprises the steps of Parsing the Query (S100), carrying out Query Analysis and Forecasting (S200), Processing the Query (S300) and Combining and Sorting the Results (S400). The sub-steps S310-S380 involved in Processing the Query (S300) are distributed across different nodes of the grid as shown in FIG. 4.

Queries over the triple store are typically conjunctive queries, i.e. the result will contain queries that match all the conditions specified in the query (unless they are optional).

Step 1: Parsing the Query and Creating the Query Model (S100 in FIG. 4)

The SPARQL parser processes the SPARQL query string and generates a query model object that is executed by the query engine. This model is a representation of the query that has been optimized for execution in the distributed environment. It is composed of a set of query paths.

Each query path represents the graph pattern contained in the WHERE clause of the query. Each query path returns its own result set. The final result set returned by the query is the union of the results returned by each query path, where the query paths are related by the UNION clause of the SPARQL syntax.

Each query path is composed of a set of query atoms. A query atom is a basic element of a query and represents a triple pattern; it is composed of subject, predicate and object elements that can be either constant values or free variables of the query. Moreover, a query atom can be associated with a filter on a free variable, which will be evaluated during the execution of the atom.

As an example, the query described above can be parsed and represented as a query path that contains the following query atoms. Our system reuses some basic elements of Sesame for parsing the query.

```
Query Path 1:

Atom 1: ?processID ebtic:processStartTime ?startTime.
Atom 2: ?processID ebtic: processEndTime ?endTime.
Atom 3: ?processID ebtic:hasTask ?taskID.
Atom 4: ?taskID rdf:type ?taskType.
Atom 5: ?taskID ebtic:startTime ?taskStartTime.
Atom 6: ?taskID ebtic:endTime ?taskEndTime.
Atom 7: OPTIONAL {?taskID ebtic:followedBy ?followingTaskID.}.
Atom 8: OPTIONAL {?taskID ebtic:precededBy ?preceedingTaskID}.
```

Transforming Complex Filter Definitions

As described before, each query atom definition also contains a list of all relevant filters that were defined in the query, i.e. all filters which are associated with the variables in the atom. These filters will be used to assign values to the variables and define the data grid filters used for querying the data store.

Logically, from the query path point of view, the set of filters defined on the various query atoms is equivalent to the conjunction of all these filters. Filters defined in this manner suit the present algorithm very well as the information flow between the atoms (as described in the following sections) implicitly handles conjunctions and no redundant information is transmitted to dependent atoms.

Disjunctions are handled by reducing them to a normal form, in order to have a consistent representation. This approach is useful in order to obtain a normal, conjunctive representation of filters in the query model, which leads to more efficient query execution. Since the SPARQL allows the user a high degree of expressiveness, in the present algorithm these filters are converted into a normalized representation.

To obtain this normalized representation, the Disjunctive Normal Form transformation (a known Boolean method to reduce a set of logic conjunctions/disjunctions to a normalised form) is used, so that all the disjunctions appear as the outer element of the filter.

As an example, consider the case where a filter in the query is defined as follows:

```
FILTER ((((?processID =
etisalat:SessionProcess12598986497699211746)||(?nodeName !=
etisalat:UserSendCredentials))&&(?value == "HR Department"))||
(?value == "Development")&&(?value!="Logistics")).
```

Representing this filter in the present query model is not straight-forward, because, as has already been discussed, logically all the filters defined on a query atom are equivalent to a conjunction, therefore the disjunction is a special case that needs to be treated separately.

Using the Disjunctive Normal Form transformation, the previous filter becomes:

```
FILTER (((?processID = etisalat:SessionProcess12598986497699211746)
&&(?value == "HR Department"))||((?nodeName !=
etisalat:UserSendCredentials))&&(? value == "HR Department"))||
((?value == Development")&&(?value!="Logistics"))).
```

In this case an all or nothing approach is taken: in case a disjunction exists in the final filter, the entire filter has to be associated with an atom, therefore all the variables in the filter have to be present in the atom. In case the entire filter cannot be assigned entirely to a query atom, the filter is split over the disjunctive operator and a copy of the query path is created for each resulting sub-filter.

As an example, in the previous case three separate filters are created:

```
FILTER ((?processID = etisalat:SessionProcess12598986497699921746)
&&(?value == "HR Department"))
FILTER((?nodeName != etisalat:UserSendCredentials))&&(? Value ==
"HR Department"))
FILTER((?value == "Development")&&(?value!="Logistics")).
```

In this case three query paths will be created and each of the filters will be associated to one of the query paths. With this approach the final filters in each of the query paths do not have any disjunction which makes it ideally suited for a distributed algorithm.

Also, considering the following query example:

```
SELECT ?a ?b
WHERE { ?d rdf:type ebtic:Process.
        ?d ebtic:hasTask ?taskId1.
        ?d ebtic:hasTask ?taskId2.
        ?task1 rdf:type ?a.
        ?task2 rdf:type ?b.
        FILTER (?a != ?b).
        }
```

In this case, it is not possible to assign the filter to a query atom. Such filters are associated with the query path and evaluated during the join of the results. Once the query model is created, it is passed to the query executor that processes it and returns the final results of the query.

Step 2: Calculating Query Weights (S310)

A query execution path is composed of several query atoms that can potentially run in parallel. In case of parallel execution, the results need to be joined together on common variables and in case the resulting set is big, the final join operation can be very expensive in terms of time and/or computing power required.

Therefore it is preferable to reduce the size and dimensionality of the intermediate result sets as much as possible. In order to do this, a Query Execution Path is defined, which is a data structure representing the execution order of the query atoms. The query path allows efficient execution of the query by identifying dependencies between atoms and the related cost of execution.

As an example, in case of Atom 1, Atom 2 and Atom 3 from the above example query, these atoms share the variable ?ProcessID. Once the system has obtained the set of values of ?ProcessID by executing the query represented by one of the atoms, it is possible to replace the variable ?ProcessID in the other atoms with the results set obtained by the query executed. Subsequently, the other execution atoms operate on the smaller set of possible values that the variable ?ProcessID can have.

In order to establish which of the atoms will be executed first, an optimization procedure is performed which assigns an execution weight or cost to each atom. The weight of an atom is calculated by predicting (where possible) the number of triples the atom execution will return. In order to do this, an index of the number of triples for each of the values in the predicate (which is the smallest set of distinct values in the data set) and a few representative subject and object values is maintained.

The weight for the query atom i(j, k, l) is $$W(j_i,k_i,l_i)=\min\{wgt(j_s),wgt(k_p),wgt(l_o)\}$$

where $wgt(x_{pos})$ returns that number of matching triples with value x in the subject, predicate or object position pos. If the term x is a variable and not a fixed value, wgt(x) returns the total size of the data store.

Note that defining filters on an atom will reduce the number of "free" or "unbound" variables, which means that the result set will be smaller in these cases. Where one or more of the free variables of an atom appear in a filter, the values defined in the filter are considered as a constraint on the atom. This way the filters can also be considered in the weighting algorithm.

Query atoms with a subject bound have the highest selectivity and will return the smallest result set, followed by atoms with an object bound. For atoms with only predicate bound, the algorithm checks the predicate count of the original data set.

When an accurate, or at least a reasonable, prediction of the result set size is not possible, an estimate is used which assigns a pre-determined weight based on the combination of variables and bound terms in the atom.

Step 3: Creating Query Execution Paths (S320)

As discussed in the previous step, the query execution algorithm is based on query execution paths. These paths define the execution order of the various query atoms. The results associated with the variables are fed into dependent query atoms in order to work with the most current information available to the system. This reduces the size of the relevant data universe and means less work to do for downstream execution atoms.

To create a query path the algorithm selects the lightest query atom (in terms of execution weight, as described in the previous step) and creates its dependent query atoms list.

Figure 5:
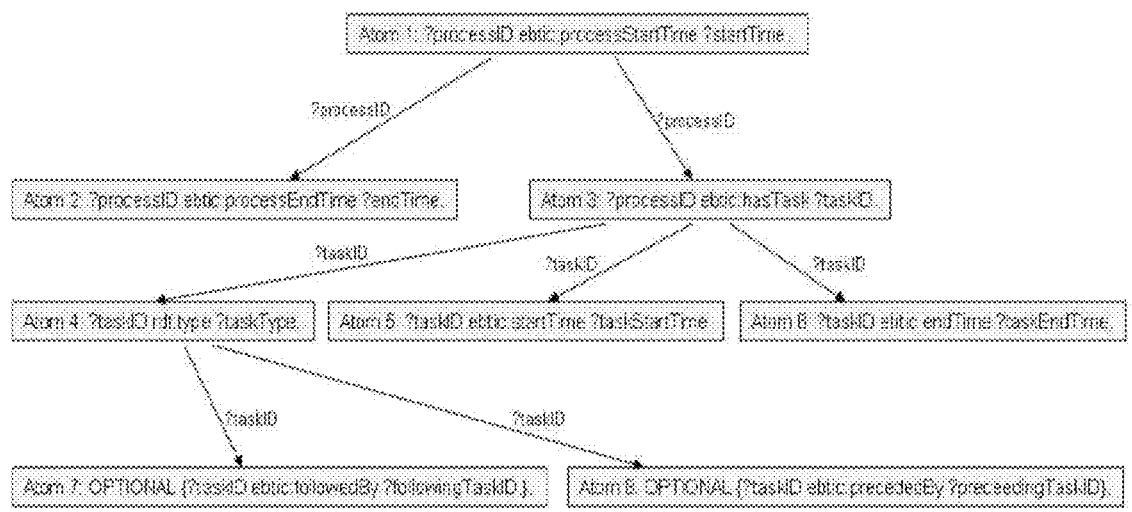
FIG. 5 shows the data flow between execution atoms in a sample query being processed according to an embodiment of the present invention.

For example, the query path shown in FIG. 5 shows a data flow between the execution atoms of the example query previously discussed. However, note that this is only one of several different query paths that could be generated by the algorithm for this query and the exact query path defined will depend upon the execution weights of the respective atoms.

A dependency map is created to describe the dependencies between the query atom and the variables, and according to this map the query path is created.

An example dependency map may be as follows:

```
?processID → Atom1, Atom2, Atom3
?startTime → Atom1
?taskID → Atom3, Atom4, Atom5, Atom6, Atom7, Atom8
```

As shown in the example query path of FIG. 5, this means that Atom1 can be executed before Atom2 and Atom3, thereby potentially reducing the data set over which Atom2 and Atom3 are executed. Similarly, Atom3 can be executed before Atom4, Atom5 and Atom6 and will potentially reduce the data set over which those atoms are executed and Atom7 and Atom8 (which are the optional atoms) can be executed after Atom4.

In case no dependencies exist the query atoms can be considered as separate execution paths that can be executed in parallel. All atoms and query paths need to complete execution before the final join operation can be performed.

Step 4: Creating Query Execution Plan (S330)

The query plan is composed of a set of query paths; since the query paths are independent of each other they can run in parallel without any problems. The final result returned is the union of the results from each path.

Executor Atoms

Executor Atoms are an executable representation of the query atoms described in the previous section. They are callable entities that provide a suitable call( ) method. The call( ) method takes the query atom and query filter definitions and converts them into data grid queries using the native representation for the data grid framework. It runs the native query and parses the query results to create a set of result triples. The native queries are able to run, in parallel, across the entire grid therefore the system does not rely on any explicit data partitioning algorithms.

The information required by these Executor Atoms includes a list of Query filters, which are used to define value assignments for input variables thus limiting the scope of the query and a list of input dependencies which will give an indication of atoms up the execution path that this atom should wait for. When these atoms complete their execution, the output from them is used to define input values for the current list of variables. The input dependencies will contain a description of expected input format, the matching variables etc.

In the present embodiment there are three types of Executor Atoms which will be described in turn below.

Ready Executor Atoms

This type of executor atom has all the information available, at the time of submission to the execution framework, to immediately begin execution, i.e. it does not need to block for any input or results from a previous executions. Ready executor atoms are executed in the first stage of query execution and typically feed data to downstream query atoms. Typically, one of the ready executor atoms is the atom with the smallest weight as calculated in Step 2 (S310), described above.

"Local" Ready Executor Atom

A special type of ready executor atom is the "local" ready executor atom. So far, all grid nodes have processed the query model in the same way, generating the same execution atoms etc. However, in the interests of scalability, the data (relevant universe) will be split across the nodes in the grid so that each node has to do a smaller amount of work. Otherwise, all nodes will return the same result set, making the grid execution costly and redundant.

The data set is split based on the first ready executor atom defined in the query path. This will typically also be the atom that returns the smallest result set. The "Local" ready executor atom is limited in scope by adding a new node/partition filter to the data grid filter so that only data that is stored locally on the execution node is queried.

For each grid node, the local ready atom will return only local results. These results are then fed to downstream atoms which execute normally (i.e. they run against data in the entire grid). As data is randomly assigned to storage nodes across the grid, this system will typically distribute the workload almost uniformly across the execution nodes.

Future Executor Atoms

A Future Executor Atom does not have all the necessary information to hand at the time of submission to the execution framework. It takes as an input a description of the dependencies/required inputs and waits for each of these in turn and pre-processes the input data to convert it to data grid queries. When all the dependencies have been satisfied, i.e. data has been received from previous executions, only then is the atom ready to begin execution.

The data grid queries that have been defined are typically combined using a Boolean filter, such as the And filter, to ensure that only results that match all the queries are returned by the atom.

The interplay between execution atoms and the data communication based on dependencies essentially embodies the "implicit join" operation. The relevant atoms will only return results for shared values, except in the case of optional atoms. Performing the join in this way is more efficient and makes the execution path smoother, with the need for fewer join operations in the path.

When the size of the results fed into the future atom from one of the upstream atoms is larger than a pre-defined threshold, the executor atom can be arranged to iterate over smaller subsets of the incoming results, executing each of these in turn and feeding the results downstream. This results in more efficient execution as it essentially sets up a pipeline so that dependent atoms can begin execution as partial results flow downstream, without having to wait for the entire result set before execution of dependent atoms can begin. An example of this execution is shown in FIG. 6.

Figure 6:
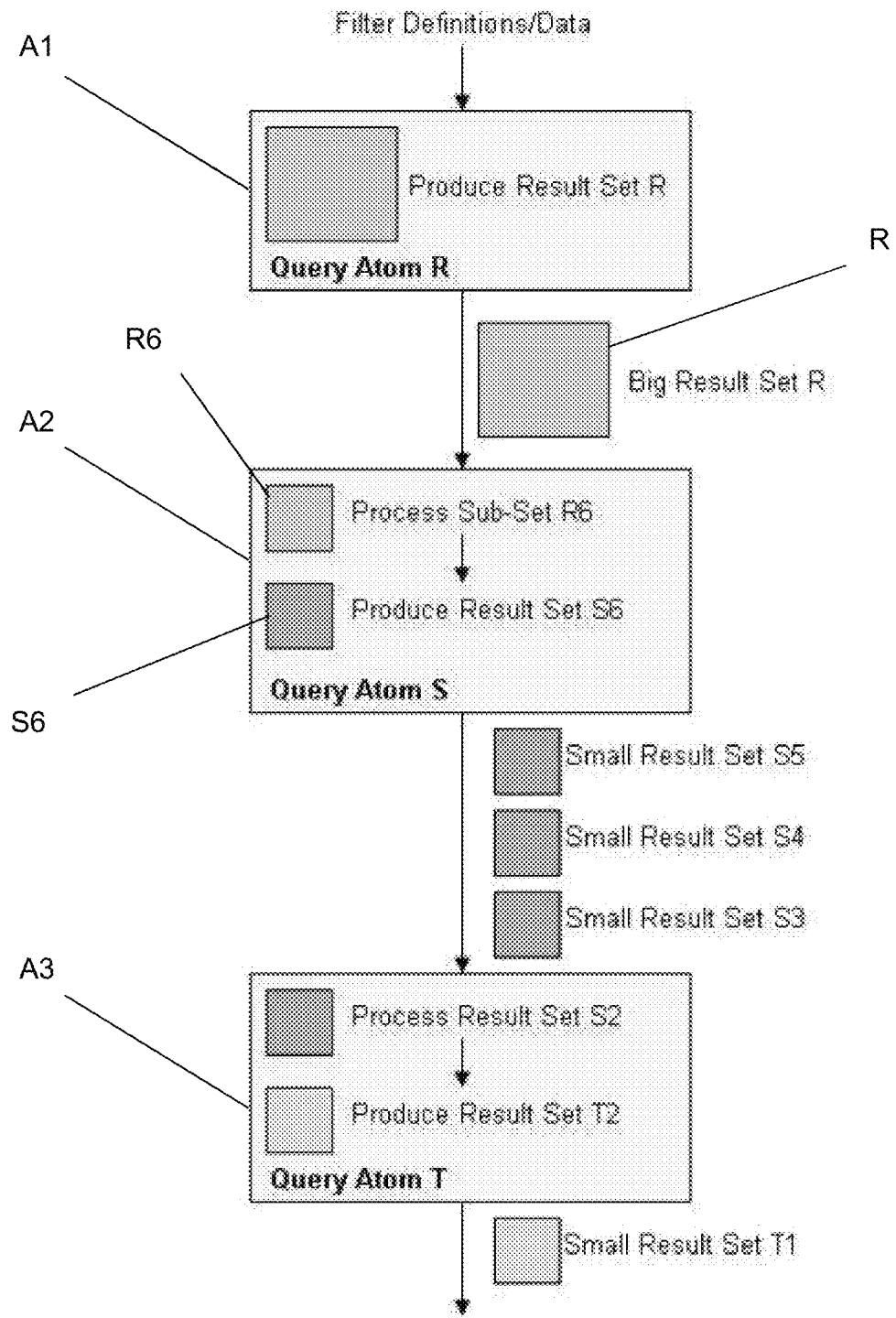
FIG. 6 shows the data flow between execution atoms for a query which needs to process a large result set.

In the execution path shown in FIG. 6, Query Atom S (A2) is dependent on the production of the results of Query Atom R (A1). However, the results of Query Atom R are a result set R which exceeds the results threshold of Query Atom S. As Query Atom T (A3) is dependent on the results of Query Atom S for its processing, Query Atom S divides the result set R into a number of subsets (R1-R6 in this case) and processes each subset to produce a corresponding subset of results (S1-S6) and passes the results to Query Atom T for further processing before starting processing of the next subset of the result set R. In that manner, as shown in FIG. 6, the results of Query Atom T on the subset R1 (T1) can be produced and passed onwards and Query Atom T can be processing another subset S2 while Query Atom S is still processing some of the results (subset R6) produced by Query Atom R.

Step 5: Executing Query Paths and Atoms (S360)

During the execution of query paths, the data dependencies that exist within each query path and between the query atoms need to be taken into account. The parallel execution of query atoms is described below. Note that these atoms can freely communicate with other relevant atoms, which could potentially be executing on a different node. The lack of restrictions on communication makes the system more flexible. Furthermore, all atoms are submitted for execution in a single stage as no explicit intermediate join operations are required.

5.1 Executing Atoms in Parallel

Identifying the atoms that can be executed in parallel efficiently is an important step in accelerating the processing according to this embodiment. Identifying the first atom that should be executed can be even more important as it kicks off the workflow. Ideally, the first atom that is executed should be the one which most reduces the size of the relevant data universe, i.e. the query atom that returns the least number of results should be executed first.

As described above, the method of this embodiment achieves this by:

1) Calculating a query weight/cost for each of the query atoms. The query atom with the lowest weight gets executed first, as described in detail in Step 2.

2) Executing an atom at the first stage if it has only one variable as it is likely to be a good candidate to serve as the root for the variable in question, i.e. the atom which first binds the variable to a data set matching a query atom.

To execute an atom, data grid filters are first defined based on the fixed values in the atom as well as any filters that have been defined on the query. Any atoms which share one or more of the variables in the current atom can serve as data inputs, i.e. atoms that feed their results into this atom.

There are cases where it is more efficient to run all query atoms in parallel, without specifying dependencies between them. This typically happens when the number of intermediate results returned from the execution of atoms is very large, i.e. in the order of hundreds of thousands or more, and waiting for the results and specifying native queries using the these results becomes cumbersome. This normally happens when there are no filters defined or when the free variables in the atom represent elements which do not have a significant bearing on the size of the result set. In such cases, it is often easier to get all the intermediate results and resolve the dependencies during the final join operation, described below.

5.1.1 Parallel Multi-Threaded Execution

The query atoms are executed on a single Java Virtual Machine using multithreading, a well-known technique in computer science that is carefully scheduled in order to avoid deadlocks.

Figure 7:
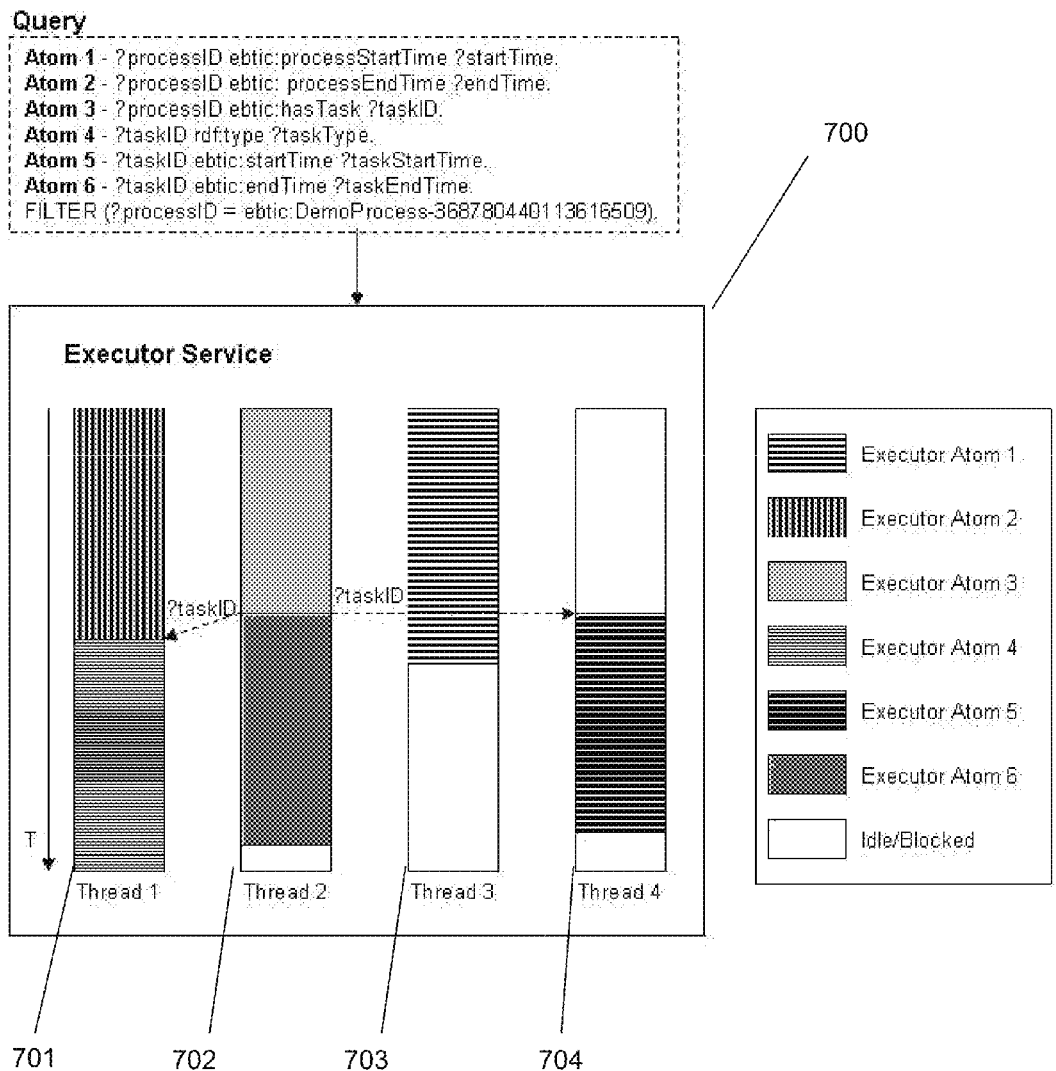
FIG. 7 shows, schematically, the arrangement of parallel processing of query atoms on a multi-threaded execution service.

The implementation of parallel creation, planning and execution of threads in the system is illustrated in FIG. 7 and described below.

The exact form of processor-level thread-based parallel execution depends on the framework chosen to implement this invention; i.e. in case of Java Execution Framework there are Executors, Futures and Barriers, to help resolve dependencies and control data flow between query atoms. In this architecture, the query atoms are converted into callable objects with predefined data grid filters. These callable objects are termed Executor Atoms.

In the Java Execution Framework, all Executor Atoms are submitted for execution to the Executor Service, which returns a Future object for each atom which provides the reference to the result object. When execution of the atom has completed the Future object will make the result of the execution available via the get( ) method.

Defined within each Executor Atom is a list of dependencies. These are the Executor Atoms that are expected to provide input data which will be used to define data grid filters. Execution is blocked until data has been obtained from all such atoms. The input data is used to define data grid filters, which are then combined with the filters that were already defined as part of the Executor Atom.

For example, as shown in FIG. 7, an Executor Service 700 having 4 threads 701-704 may allocate the executor atoms such that Executor Atoms 1, 2 and 3 are started on three of the threads 701-703 at the start of processing. Although these Executor Atoms each relate to the subject ?processID, they are executed in parallel as this is the most efficient use of the processing capacity of the Executor Service to reduce the idle/blocked periods.

Executor Atom 5 is scheduled as the first executor atom on thread 704, but at the start of the process is a Future Executor Atom which is dependent on the input data from the results of Atom 3 (?taskID) before commencement and so remains blocked until this data is passed from thread 702. This data is also passed to Executor Atoms 4 and 6 which are scheduled to run on threads 701 and 702 when the initial Executor Atoms are completed.

In most data grid systems, the execution of the native query is parallel across all grid nodes by default, e.g. results are obtained from the storage nodes in parallel. The executor atoms, in such cases, mainly serve as a mechanism that collates and structures the results.

The Executor Service 700 can be configured to contain any number of threads. This number should ideally be at least equal to the number of processor cores available on the server to enable the most efficient scheduling and utilisation of hardware resources.

5.1.2 Grid Execution

In cases where the underlying data grid provides for such functionality, the thread-based execution can also be farmed out to the data grid. As an example, many data grid solutions (e.g. Oracle Coherence) provide capabilities for the execution of code across the nodes that are part of the data grid. This functionality can be used, as an extension of the execution framework, to execute the Query in parallel.

If the data grid provides the functionality to run callable objects across the grid, the Executor Atoms, described above, can be submitted for execution to the data grid rather than to the processor-level thread execution. However, executing atoms using the data grid may not be very efficient if the query results are too large or a significant amount of data is passed between atoms. Since query atoms will typically be executing on different nodes, any data dependency potentially means additional network communication. Using processor-level multi-threading, there is no network traffic involved as intermediate results are shared using in-memory data structures.

When implementing systems which are embodiments of the present invention, system designers or users can use various alternative execution options to benchmark their systems and see which configuration works best for their deployment.

5.2 Query Atom Execution

Each query path runs by executing the query atoms in the order of the defined dependencies. The query atoms define the filters that should be executed over the data grid, more specifically the cache that contains all the triples.

As an example, consider the Atom 1 from the previous example.

?processID ebtic:processStartTime ?startTime

The atom specifies two variables, processID and startTime, and one fixed value. Assuming that there are no filters defined that assign values to either variable, the native query run against the cache will be Filter ("getPredicate", ebtic:processStartTime), where getPredicate( ) is the method that returns the predicate lookup value.

The native query essentially queries the grid to return all triples with the matching predicate value, i.e. the set of all process start times in this case.

In many cases one or both of the variables will have previously been assigned a value or a set of values. There are two ways this can happen. In the first, the value may have been assigned by filters defined in the query, such as in the example query above:

?processID=etisalat:DemoProcess-8164166017366845606.

In this case, when the filter is defined, it will assign the relevant value to the variable, ensuring that only the relevant results are returned. When more than one value is assigned, a native query is defined using the Boolean and function.

AndFilter(Filter("getPredicate",ebtic:processStartTime),
Filter("getSubject",etisalat:DemoProcess8164166017366845606)).

Another way that variables may be bound to a set of values is where the variable was part of a query atom which was executed at an earlier stage.

Again, considering the example previously discussed, Atom 2 in the query is

?processID ebtic: processEndTime ?endTime.

processID was also part of Atom 1. Assuming that no filters were defined in the query and that Atom 1 was executed before Atom 2, processID will be assigned a set of values by the execution of Atom 1. This set of values can therefore be used to reduce the number of free variables and hence the relevant universe against which Atom 2 is executed. This is an example of data dependencies between query atoms.

For example, if it is assumed that no filters have been defined on the query and that Atom 1 returns the following set of results.

| ?processID | ?endTime |
|---|---|
| etisalat: DemoProcess-111 | 2010-03-15T18:43:19.085 + 04:00 |
| etisalat: DemoProcess-222 | 2010-03-16T20:03:17.019 + 04:00 |
| etisalat: DemoProcess-333 | 2009-03-18T13:45:38.094 + 04:00 |
| etisalat: DemoProcess-444 | 2010-04-08T02:54:47.026 + 04:00 |

If Atom 2 was run in parallel, with no data dependency on Atom 1, it would return its own set of results. Since the final join operation (see below) will discard any results not in common between the two atoms, this will result in some waste since information was not shared between the atoms. Of course, any such waste will be offset by the fact that the two atoms were executed in parallel but this will depend on how many results the respective atoms are expected to return that will eventually be discarded.

However, if the atoms are executed successively, the information from Atom 1 could be used to put bounds on the values for the variable ?processID when Atom 2 is executed. The values will be used to define data grid filters limiting the set of values (scope) that the variable can be assigned, thus potentially making the execution of Atom 2 faster.

In theory, all Query Atoms can be executed in parallel with no data dependencies. This may be appropriate in cases where each atom only returns a small set of results or very large sets of results where passing data between atoms will be very expensive. However, typically for most cases in between the two extremes, it is desirable to make use of the results that are returned at each stage of execution to make the overall execution more efficient.

5.3 Intermediate Results

Intermediate results are stored either in-memory using HashMaps or in the Results Cache. These results are typically represented as key objects which contain the subject, predicate and object values. The data is passed on to dependent atoms, including the join atom, which uses this data to generate various maps and identify corresponding data points.

5.4 Results Map

The results returned from the atoms may not contain unique mappings, i.e. there can be more than one matching value for a corresponding value in a pair of terms. The system therefore makes use of MultiMaps (a known structure which allows keys to be associated with multiple values), which map each key value to a list of values. A custom implementation of the MultiMap provides the necessary functionality, overriding the get and put methods to insert and retrieve more than one value for a give key. In addition, functionality is also provided for reversing the Map, e.g. to convert a subject-predicate map to a predicate-subject map. This makes it extremely easy for query atoms down the execution path to easily manipulate the input/output data.

If the data grid is used to store the intermediate results, a similar strategy is used whereby the map contains a mapping from key to a List object that contains all the matching values.

Step 6: Join Operation and Creating the Final Result Set (S370 & S380)

The join step is executed once all query atoms have finished execution. Intermediate results for each query path are the results from the execution of each query atom. These results need to be combined to return a single result set.

Figure 8:
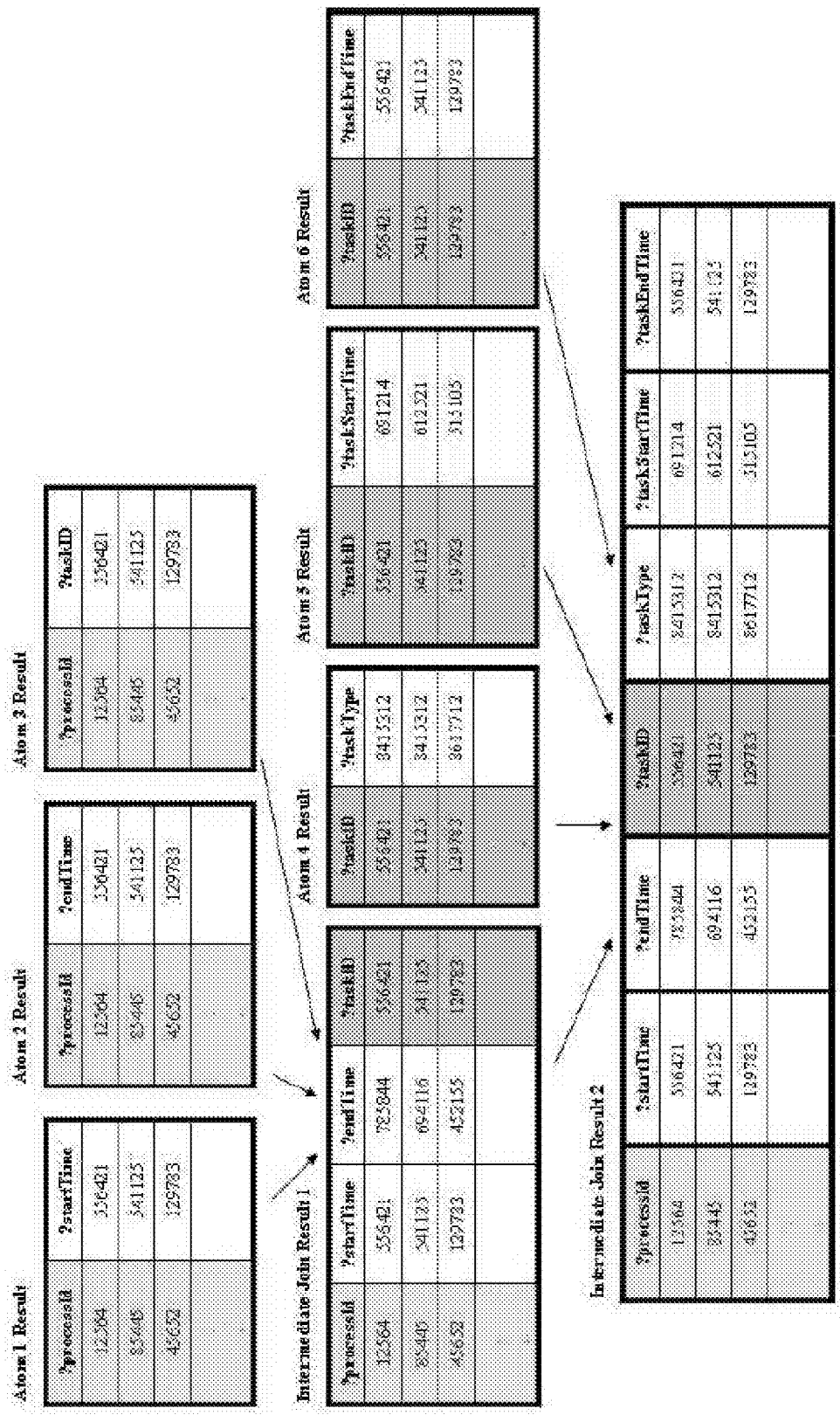
FIG. 8 shows the process of joining intermediate results.

FIG. 8 illustrates two intermediate join operations carried out on intermediate results, based on the example query previously discussed. In the first join operation, the results from the parallel execution of Atoms 1 to 3 are combined to produce the Intermediate Join Result 1. Atoms 4 to 6 are then executed for the ?taskID contained in Intermediate Join Result 1 and the results combined to produce Intermediate Join Result 2.

The query atoms may share variables (such as ?processID and ?taskID in Atoms 1 to 3 and 4 to 6 respectively in FIG. 8), in which case the results will be a join operation on the relevant atoms using the shared variable. In cases where such atoms were executed in parallel, i.e. there was no data dependency between them and hence no down streaming of intermediate results, the join operation will serve to reduce the size of the result set to only include those values that are common to both intermediate result sets.

The amount of work that the join operation has to do is greatly reduced because of the data flow between atoms during execution and the "implicit" joins, as discussed in section 5 above. As a result, the amount of data that typically has to be handled by the join operation is significantly smaller than other similar systems.

As described in Step 2, in case any filters exist that could not be assigned to a query atom, these filters are also evaluated during this step.

Query Union

Each query path will return a single set of results, as described above. The result of the entire query is the union of the results of each path, i.e. the set of triples which match at least one query path. Duplicate triples are removed from the final set of results.

Collation and Sorting of Results

The primary node (the node that parses the query and initiates the distributed execution) receives all of the results and sorts them according to any specified sort variables. This is done by defining a TreeSet (a known data structure that represents an ordered set as a tree) collection for storing the results, with a custom comparator that compares entries using the sort variables. Computationally this helps in maintaining access time for normal operations (add, remove, access) to log(n). Alternatively, a simple list collection can also be used to store the results, with a final sort operation using the custom comparator.

Figure 9:
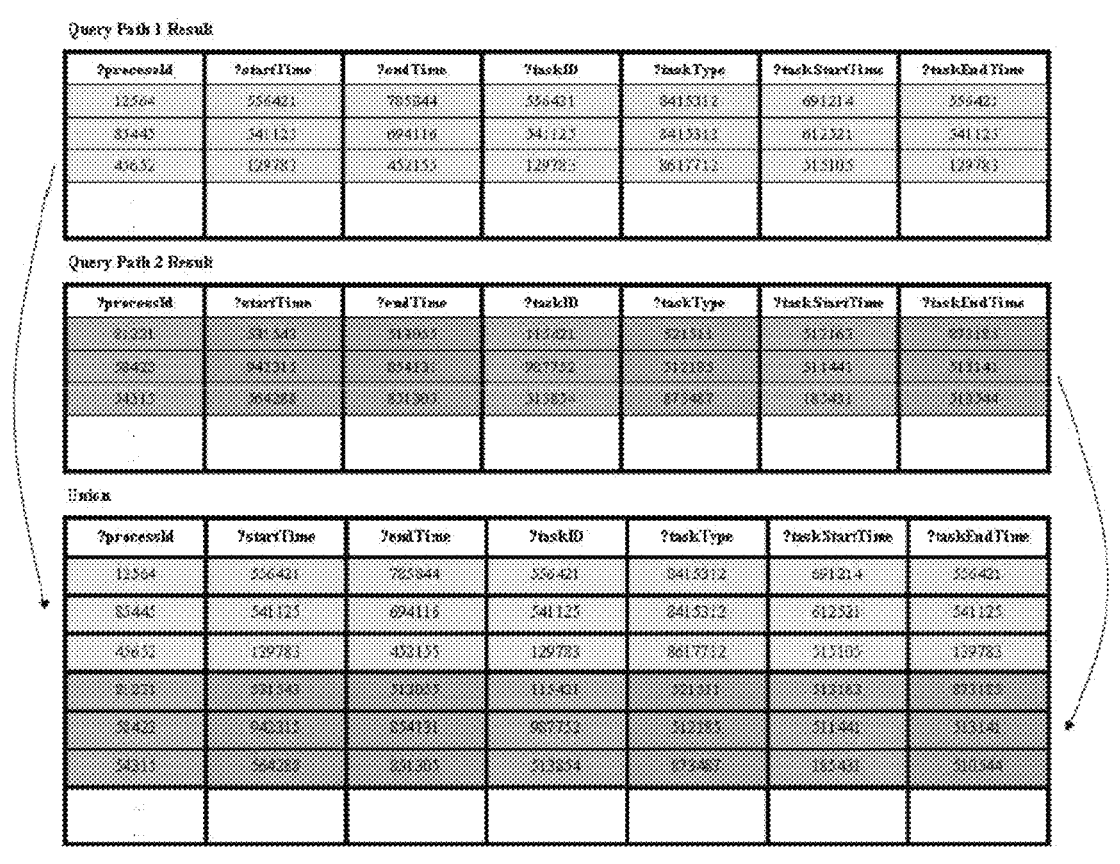

FIG. 9 shows a union operation for combining results from different Query Paths.

Further Data Optimisation and Dynamic Data Partitioning

The method described above is useful for the general case where there is a continuously changing data set and it is not known ahead of time what kind of queries will be executed on the grid. However, in cases where the most common set of queries is known in advance, there are certain optimisation techniques that can be used to further improve the performance of the query engine, including data partitioning algorithms, so that "related data" (in the context of the queries) is stored on the same node. Such data partitioning is not a pre-requisite of our system, but may provide for performance improvements in certain situations.

In such situations, the system additionally comprises a Query Analysis module which analyses the queries that are executed on the grid and generates a usage analysis report identifying the most common cases (S200 in FIG. 4). These common cases are then analysed further to identify the constituent atoms, i.e. the most common triple patterns that generate queries to the underlying storage system. These atoms and their relationships are used to change the data affinity parameters in the data grid. Moving around data in such way will reduce the data communication significantly when query atoms are executed. However, the system is preferably configured to ensure that repartitioning the data does not happen too frequently (which would, in itself, result in significant additional data communication).

Optimally, in the best-case scenario, where data communication at the execution stage is eliminated, except when results are returned to the requesting entity, the query execution resembles a single-stage Map/Reduce problem.

For example, taking the example query that has previously been discussed. If this (and similar) queries make up a large proportion of the queries being executed, the query analysis module is arranged to redefine the data affinity rules (e.g. in Oracle Coherence) to ensure that process IDs and task IDs related by the triple, ?processID ebtic:hasTask ?taskID, and all triples related to these process IDs and task IDs are stored on the same node.

There may be certain cases, however, where data is not re-partitioned. A typical example of this is when re-partitioning would cause serious imbalances in terms of data storage across the nodes. In particular this may include the scenario where data re-partitioning based on predicate values is suggested following the query analysis. As there are normally no more than 20 to 30 predicates defined in a data set, using these values to partition data would overload some nodes while leaving others with very little or no data. Re-partitioning in such cases could therefore seriously impact the scalability of query execution.

The methods and systems described in the above embodiments are preferably combined and used in conjunction with each other.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. Eric Prud'hommeaux, Andy Seaborne *SPARQL Query Language for RDF* W3C Recommendation 15 Jan. 2008 http://www.w3.org/TR/rdf-sparql-query/
[2]. *RDF Semantic Web Standard* http://www.w3.org/RDF/
[3]. *Sesame 2.x* http://www.openrdf.org/
[4]. *Jena—A Semantic Web Framework for Java* http://jena.sourceforge.net/
[5]. *Oracle Database Semantic Technologies* http://www.oracle.com/technetwork/database/options/semantic-tech/index.html
[6]. *BigOWLIM—OWL Semantic Repository* http://www.ontotext.com/owlim/big/
[7]. *AllegroGraph RDFStore Web 3.0's Database* http://www.franz.com/agraph/allegrograph/
[8]. *4store—Scalable RDF storage* http://4store.org/
[9]. Steve Harris, Andy Seaborne *SPARQL 1.1 Query Language* W3C Working Draft 14 Oct. 2010 http://www.w3.org/TR/sparql11-query/
[10]. tsc++ Project Website http://tsc.sti2.at/
[11]. Atlas http://atlas.di.uoa.gr/
[12]. U.S. Pat. No. 7,650,331 System and method for efficient large-scale data processing http://patft.uspto.gov/netacgi/nph-Parser?Sect1=PTO1&Sect2=HITOFF&d=PALL&p=1 &u=%2Fnetahtml%2FPTO%2Fsrchnum.htm&r=1&f=G&l=50&s1=7,650,331.PN.OS=PN/7,650,331&RS=PN/7,650,331
[13]. Large Knowledge Collider (LarKC) http://www.larkc.eu/
[14]. SHARD http://www.cloudera.com/blog/2010/03/how-raytheon-researchersare-using-hadoop-to-build-a-scalable-distributed-triple-store/ All references referred to above are hereby incorporated by reference.

The invention claimed is:

1. A method of processing a query on a graph data set stored on a plurality of nodes, the method including the steps of:
   dividing the query into one or more atoms which define individual queries on the graph data set;
   calculating the execution cost of each atom in the query;
   determining one or more query paths which set out an order in which one or more atoms are to be executed using said calculated execution costs and interdependence between said atoms;
   determining a query execution plan which is a set of said query paths which can be executed in parallel;
   executing said atoms on each of said nodes in accordance with said query execution plan; and
   combining the results of each query path to produce a result set that is the answer to said query;
   wherein the calculation of th execution cost is carried out by determining for each atom, a weight which for an atom i(j,k,l)is $$W(j_j, k_i, l_i) = \min\{wgt(j_s), wgt(k_p), wgt(l_o)\}$$

where $wgt(x_{pos})$ is the number of matching triples with value x in the subject, predicate or object position pos if x is a constant, or the total size of the graph data set if x is a variable, and s, p and o are the subject, predicate and object positions respectively.

2. A method according to claim 1, further including the step of storing data into the graph data set.

3. A method according to claim 2, wherein the step of storing data includes the step of converting the data in each triple from character strings to numeric representations.

4. A method according to claim 3 wherein the numeric representations are sequence numbers.

5. A method according to claim 4 wherein the step of storing data includes the sub-steps of:
   parsing data to be stored to determine a triple containing character strings;
   comparing each of said character strings against a plurality of stored character strings and their associated sequence numbers;
   if a character string matches a stored character string, using the sequence number associated with said stored character string to replace the character string in the triple;
   if a character string does not match any stored character string, obtaining a new sequence number, replacing the character string in the triple with said new sequence number and storing said character string associated with said new sequence number; and
   storing said triple.

6. A method according to claim 1 wherein, where a query path contains a plurality of atoms, when said step of executing is performed for an atom which is not a first atom in a query path, said atom is only executed on the results of previously executed atoms in the query path.

7. A method according to claim 6 wherein, where the size of results from an atom exceeds a predetermined threshold, a subset of the results from said atom are passed to the subsequent atom or atoms in the query path before the execution of said atom is completed.

8. A method according to claim 1 wherein the calculation of the execution cost for each atom is carried out by assessing the number of instances in said graph data set of one or more constants contained within said atom.

9. A method according to claim 1 wherein a query path may contain atoms which can be executed in parallel to each other as well as atoms which can be executed sequentially.

10. A method according to claim 1 wherein the step of executing includes executing the first atom in a query path on each node only in respect of data stored on said node.

11. A method according to claim 1 wherein the query includes a filter which is a limit on the value of one or more variables in the graph data set, and the step of dividing further includes assigning said filter to each of the atoms which relate to said variables.

12. A method according to claim 11 wherein if said filter is disjunctive, the method includes the further steps of:
   determining whether it is possible to assign said filter as a whole to an atom which features all of the variables in the filter and if so, assigning it to all such atoms;
   if it is not possible to so assign said filter, dividing said filter into a plurality of conjunctive filters and assigning a query path to each of said conjunctive filters.

13. A method according to claim 12 further including the step of, when said filter cannot be assigned to any atom, applying said filter to the results of said step of combining.

14. A method of processing a query on a graph data set stored on a plurality of nodes, the method including the steps of:
   dividing the query into one or more atoms which define individual queries on the graph data set;
   calculating the execution cost of each atom in the query;
   determining one or more query paths which set out an order in which one or more atoms are to be executed using said calculated execution costs and interdependence between said atoms;
   determining a query execution plan which is a set of said query paths which can be executed in parallel;
   executing said atoms on each of said nodes in accordance with said query execution plan; and
   combining the results of each query path t . duce a result set that is the answer to said query; and
   wherein the graph data set stores the data as triples comprising a subject, a predicate and an object, wherein the subject and object are variables and the predicate describes the relationship between the subject and the object; and
   wherein the calculation of the execution cost is carried out by determining, for each atom, a weight, which for an atom i(j,k,l) is $$W(j_j, k_i, l_i) = \min\{wgt(j_s), wgt(k_p), wgt(l_o)\}$$

where $wgt(x_{pos})$ is the number of matching triples with value x in the subject, predicate or object position pos if x is a constant, or the total size of the data set if x is a variable, and s, p and o are the subject, predicate and object positions respectively.

15. A method according to claim 1 wherein a query path is determined by:
   setting the atom with the lowest execution cost as the first atom in the path;
   setting as a subsequent atom in the path an atom which is dependent on said firs in that it shares one or more variables with said first atom; and
   repeating until all atoms which are dependent on the first atom or any subsequent atoms have been set in the path.

16. A method according to claim 15 wherein, where there are a plurality of atoms which are dependent, the subsequent atoms are set in order of execution cost of those atoms.

17. A system for storing business process data, the system having a plurality of nodes which are connected to each other via a network, each node having a data storage and a data processing device, wherein:
- the system stores business process data as a graph data set in a distributed fashion on the data storages of the plurality of nodes; and
- the data processing device of each node is arranged to processing a query on the graph data set by:
- dividing the query into one or more atoms which define individual queries on the graph data set;
- calculating the execution cost of each atom in the query;
- determining one or more query paths which set out an order in which one or more atoms are to be executed using said calculated execution costs and interdependence between said atoms;
- determining a query execution plan which is a set of said query paths which can be executed in parallel;
- executing said atoms on each of said nodes in accordance with said query execution plan;
- combining the results of each query path to produce a result set that is the answer to said query;
- wherein the calculation of the execution cost is carried out by determining, for each atom, a weight, which for an atom i(j,k,l) is $$W(j_i,k_i,l_i)=\min\{wgt(j_s),wgt(k_p),wgt(l_o)\}$$

where $wgt(x_{pos})$ is the number of matching triples with value x in the subject, predicate or object position pos if x is a constant, or the total size of the graph data set if x is a variable, and s, p and o are the subject, predicate and object positions respectively.

18. A system according to claim 17 wherein the graph data set stores the data as triples comprising a subject, a predicate and an object, wherein the subject and object are variables and the predicate describes the relationship between the subject and the object and at least one of the data processing devices is arranged to converting the data in each triple from character strings to numeric representations prior to storing the data.

19. A system according to claim 18 wherein the data processing device is arranged to monitor business process messages and to
- parse data to be stored to determine a triple containing character strings;
- compare each of said character strings against a plurality of stored character strings and their associated sequence numbers;
- if a character string matches a stored character string, use the sequence number associated with said stored character string to replace the character string in the triple;
- if a character string does not match any stored character string, obtain a new sequence number, replacing the character string in the triple with said new sequence number and storing said character string associated with said new sequence number; and
- store said triple.

20. A system according to claim 17 wherein, where a query path contains a plurality of atoms, the data processing device is arranged to execute atoms which are not a first atom in a query path, only on the results of previously executed atoms in the query path.

21. A system according to claim 20 wherein, where the size of results from an atom exceeds a predetermined threshold, the data processing device is arranged to execute a subsequent atom or atoms in the query path on a subset of the results from said atom before the execution of said atom is completed.

22. A system according to claim 17 wherein the data processing device calculates the execution cost for each atom by assessing the number of instances in said graph data set of one or more constants contained within said atom.

23. A system according to claim 17 wherein the data processing device determines a query path by:
- setting the atom with the lowest execution cost as the first atom in the path;
- setting as a subsequent atom in the path an atom which is dependent on said first atom in that it shares one or more variables with said first atom; and
- repeating until all atoms which are dependent on the first atom or any subsequent atoms have been set in the path.

24. A system according to claim 17 wherein the data processing device on each node is arranged to execute the first atom in a query path on the respective node only in respect of data stored on said node.

* * * * *

UNITED STATES PATENT AND TRADEMARK OFFICE
CERTIFICATE OF CORRECTION

PATENT NO. : 9,639,575 B2  Page 1 of 1
APPLICATION NO. : 13/435747
DATED : May 2, 2017
INVENTOR(S) : Marcello Leida et al.

It is certified that error appears in the above-identified patent and that said Letters Patent is hereby corrected as shown below:

In the Claims

Column 30, Line 37, Claim 14, after "combining the results of each query path", delete "t . duce" and insert -- "to produce" --

Column 30, Line 59, Claim 15, after "dependent on said" delete "firs" and insert -- "first atom" --

Signed and Sealed this
Eighth Day of August, 2017

Joseph Matal
*Performing the Functions and Duties of the*
*Under Secretary of Commerce for Intellectual Property and*
*Director of the United States Patent and Trademark Office*